US010417770B2

(12) United States Patent
Ding

(10) Patent No.: US 10,417,770 B2
(45) Date of Patent: Sep. 17, 2019

(54) EFFICIENT ACQUISITION OF A TARGET IMAGE FROM AN ORIGINAL IMAGE

(71) Applicant: Alibaba Group Holding Limited, George Town (KY)

(72) Inventor: Wei Ding, Hangzhou (CN)

(73) Assignee: Alibaba Group Holding Limited, George Town, Grand Cayman (KY)

(*) Notice: Subject to any disclaimer, the term of this patent is extended or adjusted under 35 U.S.C. 154(b) by 44 days.

(21) Appl. No.: 15/818,609

(22) Filed: Nov. 20, 2017

(65) Prior Publication Data

US 2018/0075608 A1 Mar. 15, 2018

Related U.S. Application Data

(63) Continuation of application No. PCT/CN2016/080445, filed on Apr. 28, 2016.

(30) Foreign Application Priority Data

May 29, 2015 (CN) .......................... 2015 1 0291061

(51) Int. Cl.
G06T 7/13 (2017.01)
G06T 7/136 (2017.01)
(Continued)

(52) U.S. Cl.
CPC .............. G06T 7/13 (2017.01); G06T 3/4007 (2013.01); G06T 7/11 (2017.01); G06T 7/136 (2017.01);
(Continued)

(58) Field of Classification Search
CPC ...... H03M 7/30–707; H04N 19/00–99; H04N 1/41–419; H04N 5/917; H04N 5/919; H04N 5/9261; H04N 5/9264
See application file for complete search history.

(56) References Cited

U.S. PATENT DOCUMENTS 6,417,867 B1 7/2002 Hallberg
8,520,098 B2* 8/2013 Watanabe .............. H04N 5/772
348/222.1
(Continued)

FOREIGN PATENT DOCUMENTS

CN 101511022 8/2009
CN 101630360 1/2010
(Continued)

OTHER PUBLICATIONS

Search Report arid Written Opinion by the Intellectual Property Office of Singapore in Singapore Applictaion No. 11201709583S dated Aug. 21, 2018; 7 pages.
(Continued)

Primary Examiner — Santiago Garcia
(74) Attorney, Agent, or Firm — Fish & Richardson P.C.

(57) ABSTRACT

An original image is acquired, where the original image comprises a target image. Image compression processing is performed on the original image according to a preset compression ratio, and a low-pixel image is created based on the image compression processing. Borderlines of the target image in the low-pixel image are determined. The determined borderlines of the low-pixel image are mapped into the original image, and a target image is created from the original image.

14 Claims, 9 Drawing Sheets

(51) Int. Cl.
*G06T 7/11* (2017.01)
*G06T 7/90* (2017.01)
*G06T 3/40* (2006.01)

(52) U.S. Cl.
CPC ...... *G06T 7/90* (2017.01); *G06T 2207/10024* (2013.01)

(56) References Cited

U.S. PATENT DOCUMENTS

| | | | |
|---|---|---|---|
| 2006/0034500 A1* | 2/2006 | Quist | G06T 3/0075 382/130 |
| 2007/0139536 A1* | 6/2007 | Watanabe | H04N 5/772 348/231.99 |
| 2007/0297650 A1* | 12/2007 | Rabinovich | G06K 9/00288 382/118 |
| 2011/0199394 A1 | 8/2011 | Toraichi et al. | |
| 2011/0228295 A1* | 9/2011 | Doida | G06T 5/50 358/1.9 |
| 2011/0243470 A1* | 10/2011 | Noguchi | H04N 19/176 382/239 |
| 2012/0014608 A1 | 1/2012 | Watanabe | |
| 2012/0057802 A1* | 3/2012 | Yuki | H04N 19/46 382/243 |
| 2012/0263226 A1* | 10/2012 | Inohiza | H04N 19/37 375/240.02 |
| 2012/0275718 A1* | 11/2012 | Takamori | G06K 9/36 382/238 |
| 2015/0016747 A1* | 1/2015 | Huang | G06T 3/4038 382/282 |
| 2015/0085943 A1* | 3/2015 | Taniguchi | H04N 5/21 375/240.29 |
| 2017/0148421 A1* | 5/2017 | Liu | G06F 3/14 |
| 2017/0316563 A1* | 11/2017 | Nakaya | A61B 6/505 |

FOREIGN PATENT DOCUMENTS

| | | |
|---|---|---|
| CN | 101742291 | 6/2010 |
| CN | 101849246 | 9/2010 |
| CN | 102800094 | 11/2012 |
| CN | 103927767 | 7/2014 |
| CN | 105139364 | 12/2015 |
| JP | 2001-188910 | 7/2013 |
| WO | 2016017272 | 2/2016 |

OTHER PUBLICATIONS

International search Report of the International Searching Authority issued in international Application No. PCT/CN2016/080445 dated Jun. 20, 2016; 8 pages.
European Extended Search Report in European Application No. 16802417.2, dated Dec. 14, 2018, 11 pages.
Sugandi et al., "Tracking of Moving Objects by Using a Low Resolution Image," Innovative Computing, Information and Control, ICICIC'07. Second International Conference, 2007, 4 pages.

* cited by examiner

EFFICIENT ACQUISITION OF A TARGET IMAGE FROM AN ORIGINAL IMAGE

This application is a continuation of PCT Application No. PCT/CN2016/080445, filed on Apr. 28, 2016, which claims priority to Chinese Patent Application No. 201510291061.2, filed on May 29, 2015, and each application is incorporated by reference in its entirety.

TECHNICAL FIELD

The present disclosure relates to the field of image processing.

BACKGROUND

With the rapid development of science and technology, video technologies are widely used in various fields for many purposes. For example, video technologies can be used for monitoring a specific visual scene and retrieving a target person from an image of the visual scene. When an original image that is collected by a camera is processed, it is often necessary to identify a target object or a target person from the original image to determine a target image. Conventional systems may determine a target image from the original image by scanning pixels in the original image one-by-one to determine borderlines of the target image in relation to the original image. When the original image has a high resolution, the process of determining borderlines and acquiring the target image from the original image can take a significant amount of time. As a result, overall processing efficiency can be low.

SUMMARY

The present disclosure describes techniques to reduce the time required to acquire a target image from an original image. In some implementations, an original image is converted into a low-pixel image according to a preset compression ratio. This happens before borderlines are determined. Once the borderlines are determined, the borderlines are mapped onto the original image.

In an implementation, a computer-implemented method comprises: acquiring an original image, wherein the original image comprises a target image; performing image compression processing on the original image according to a preset compression ratio, and creating a low-pixel image based on the image compression processing; determining borderlines of the target image in the low-pixel image; and mapping the determined borderlines of the low-pixel image into the original image, and creating a target image from the original image.

Implementations of the described subject matter, including the previously described implementation, can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented in particular implementations, so as to realize one or more of the following advantages. The efficiency of generating a target image can be improved.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes techniques for image processing and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Figure 1:
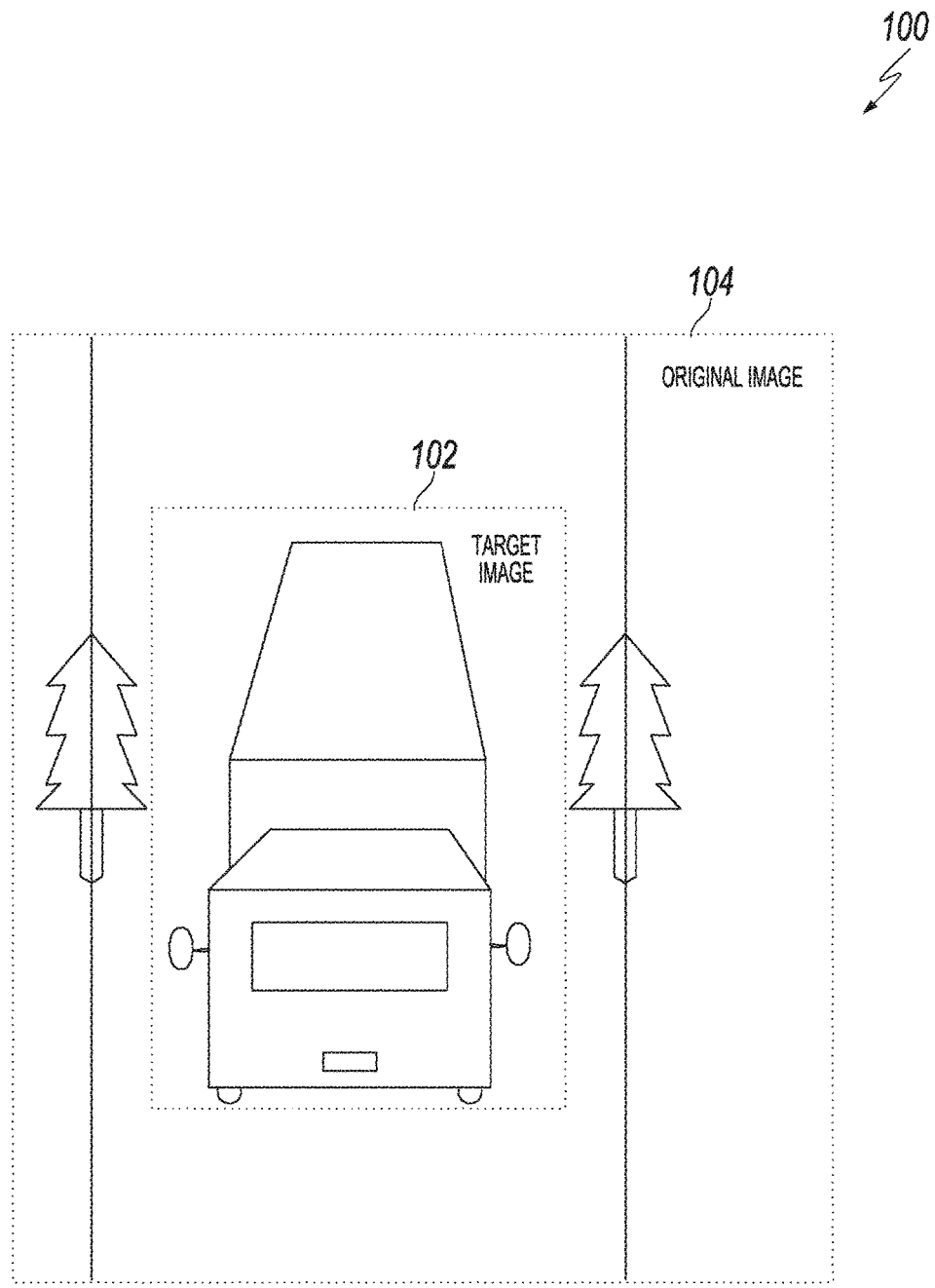
FIG. 1 is a block diagram illustrating an example of a target image obtained from an original image, according to an implementation of the present disclosure.

FIG. 1 is a block diagram illustrating an example of a target image 102 obtained from an original image 104, according to an implementation of the present disclosure. Conventional systems may determine a target image from the original image by scanning pixels in the original image one-by-one to determine borderlines of the target image in relation to the original image. When the original image has a high resolution, the process of determining borderlines and acquiring the target image from the original image can take a significant amount of time. As a result, overall processing efficiency can be low In order to solve this problem, an original image can be converted into a low-pixel image according to a preset compression ratio. Borderline detection can be performed on the low-pixel image to determine borderlines of the target image included in the low-pixel image. The borderlines included in the low-pixel image can be mapped into the original image to acquire the target image included in the original image. The original image can be converted into a low-pixel image. Since the low-pixel image includes fewer pixel points and the target image is acquired based on the low-pixel image, the processing time for acquiring the target image can be reduced and the efficiency of acquiring the target image can be increased.

Figure 2:
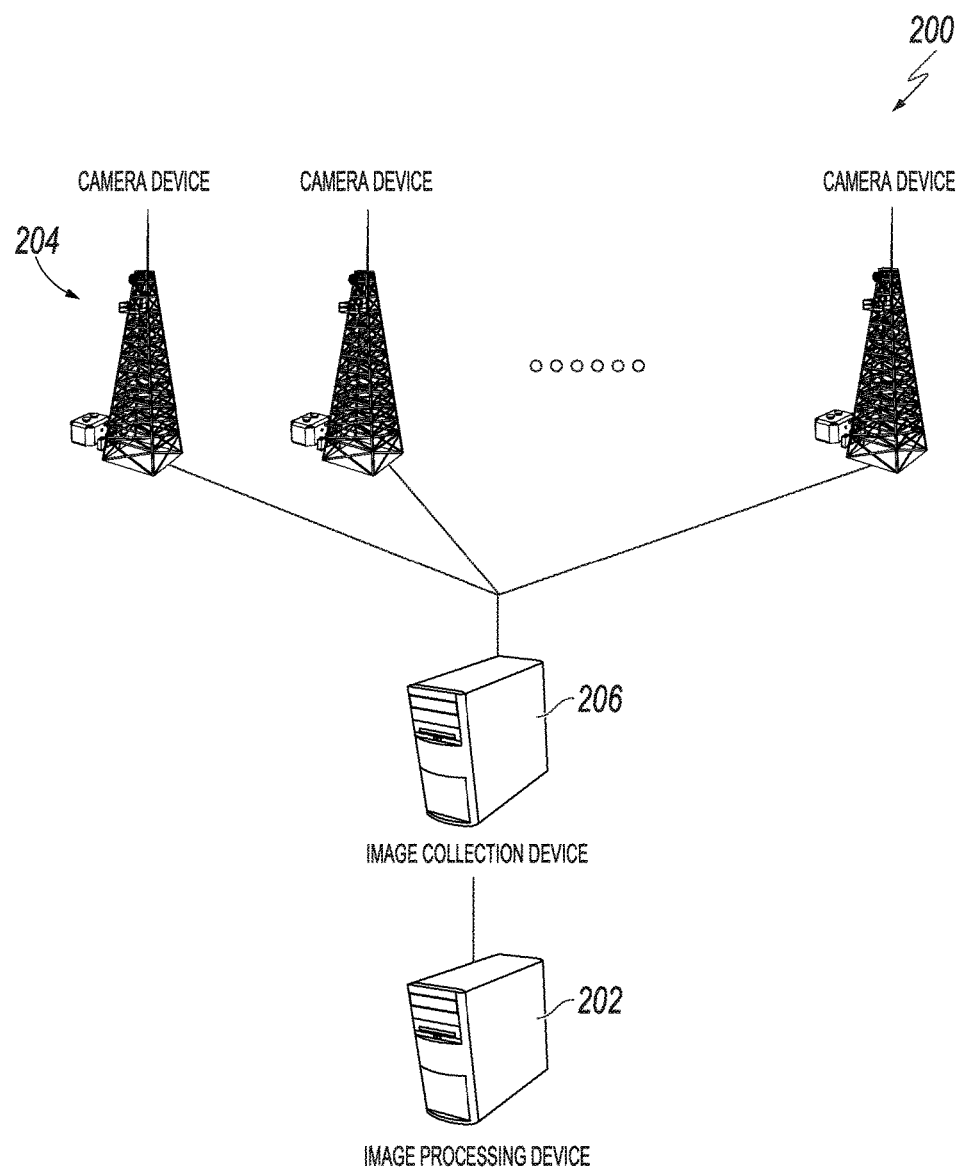
FIG. 2 is a block diagram illustrating an example of an architecture of an image processing system, according to an implementation of the present disclosure.

FIG. 2 is a block diagram illustrating an example of an architecture of an image processing system 200, according to an implementation of the present disclosure. The image processing system 200 includes an image processing device 202 configured to process an acquired original image and determine a target image from the original image. The image processing device 202 includes a user interaction interface for presenting the target image to users. The image processing device 202 also includes a plurality of camera devices 204 configured to provide original images to be processed in the image processing device 202. The image processing device 202 includes an image collection device 206 configured to collect the original images provided by the camera devices 204 and to send the collected original images to the image processing device 202. In some implementations, the image processing device 202 can include various mobile terminals having camera functions.

Figure 3:
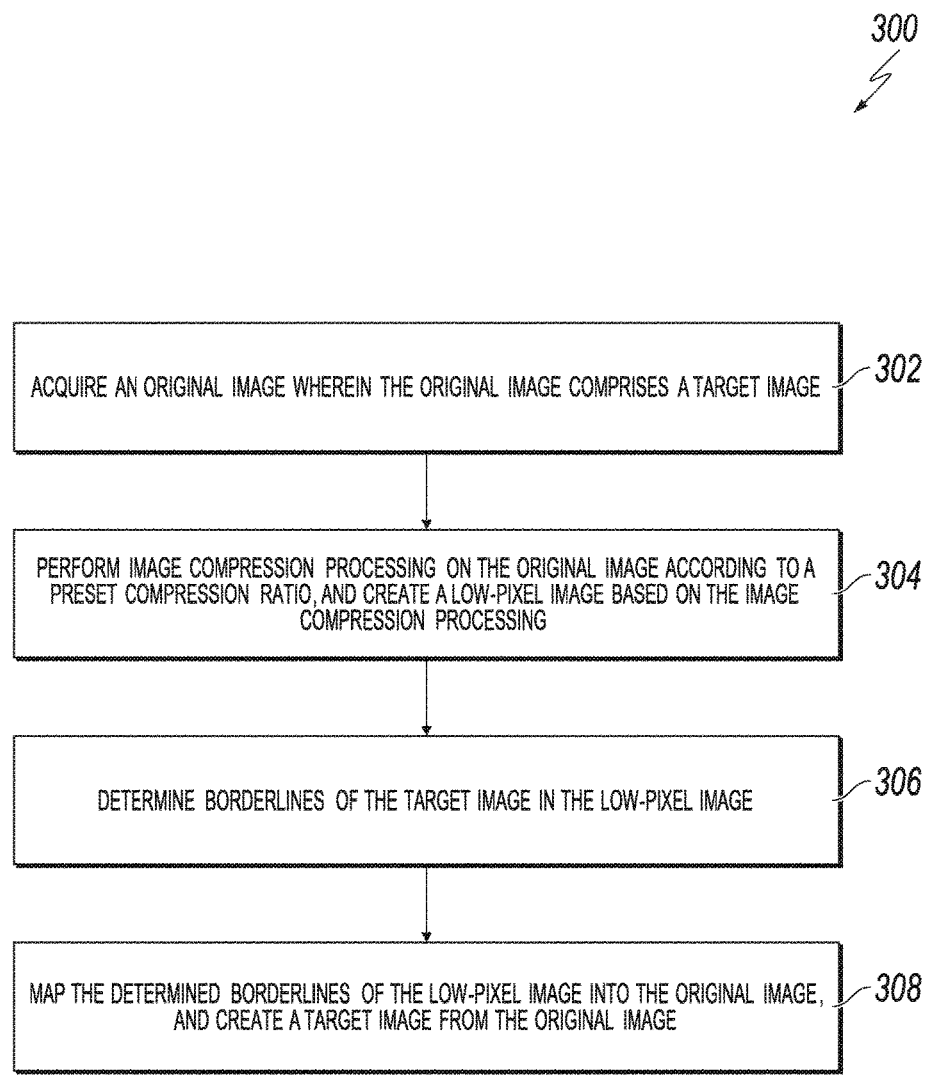
FIG. 3 is a flowchart illustrating an example of a computer-implemented method for processing an original image to acquire a target image included in the original image, according to an implementation of the present disclosure.

FIG. 3 is a flowchart illustrating an example of a computer-implemented method 300 for processing an original image to acquire a target image included in the original image, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, an original image is acquired. The original image comprises a target image. For example, the image collection device 206 can send the original image acquired from each camera device 204 to the image processing device 202. From 302, method 300 proceeds to 304.

At 304, image compression processing is performed on the original image according to a preset compression ratio, and a low-pixel image is created based on the image compression processing. For example, the image processing device 202 can determine a position of each pixel point in the low-pixel image according to the preset compression ratio. The image processing device 202 can then perform image compression processing on the original image by using a fast bilinear interpolation algorithm. As a result of the processing, a pixel value of each pixel point in the low-pixel image is acquired. The image processing device 202 can generate the low-pixel image according to the pixel value and the position of each pixel point after compression. The preset compression ratio can be a value that is pre-configured according to a specific application scenario. The preset compression ratio can include a horizontal compression ratio and a longitudinal compression ratio that are also pre-configured. The horizontal compression ratio may or may not be equal to the longitudinal compression ratio. From 304, method 300 proceeds to 306.

At 306, borderlines of the target image in the low-pixel image are determined. For example, the image processing device 202 can determine borderlines of the target image.

In some implementations, because the target image may include some specific graphic portions, the specific graphic portions may cause interference on the later detection process of the borderlines of the target image, which can cause an error in the detected borderlines of the target image. Therefore, when the borderlines of the target image are determined from the low-pixel image, it may be necessary to first eliminate the specific graphic portions, to detect only the to-be-detected region that does not include the specific graphic portions, and determine the borderlines of the target image from the to-be-detected region. For example, for an original image, including an identification (ID) card image, the ID card image is taken as a target image, and in this case, a portrait portion and a text portion included in the target image can be the specific graphic portions. From 306, method 300 proceeds to 308.

At 308, the determined borderlines of the low-pixel image are mapped into the original image, and a target image is created from the original image. For example, the image processing device 202 can map the borderlines to the original image and create the target image from the original image based on the location of the borderlines. The target image can be created at high resolution.

In some implementations, position information of intersection points of the borderlines included in the low-pixel image can be acquired. The acquired intersection points can be separately mapped into the original image according to the preset compression ratio. The points mapped from the intersection points into the original image can be successively connected, and a quadrangle generated after the connection can be determined as the target image included in the original image. In some implementations, an inverse process of the fast bilinear interpolation algorithm in step 304 can be adopted to map each of the intersection points to the original image. After 308, method 300 stops.

Figure 4:
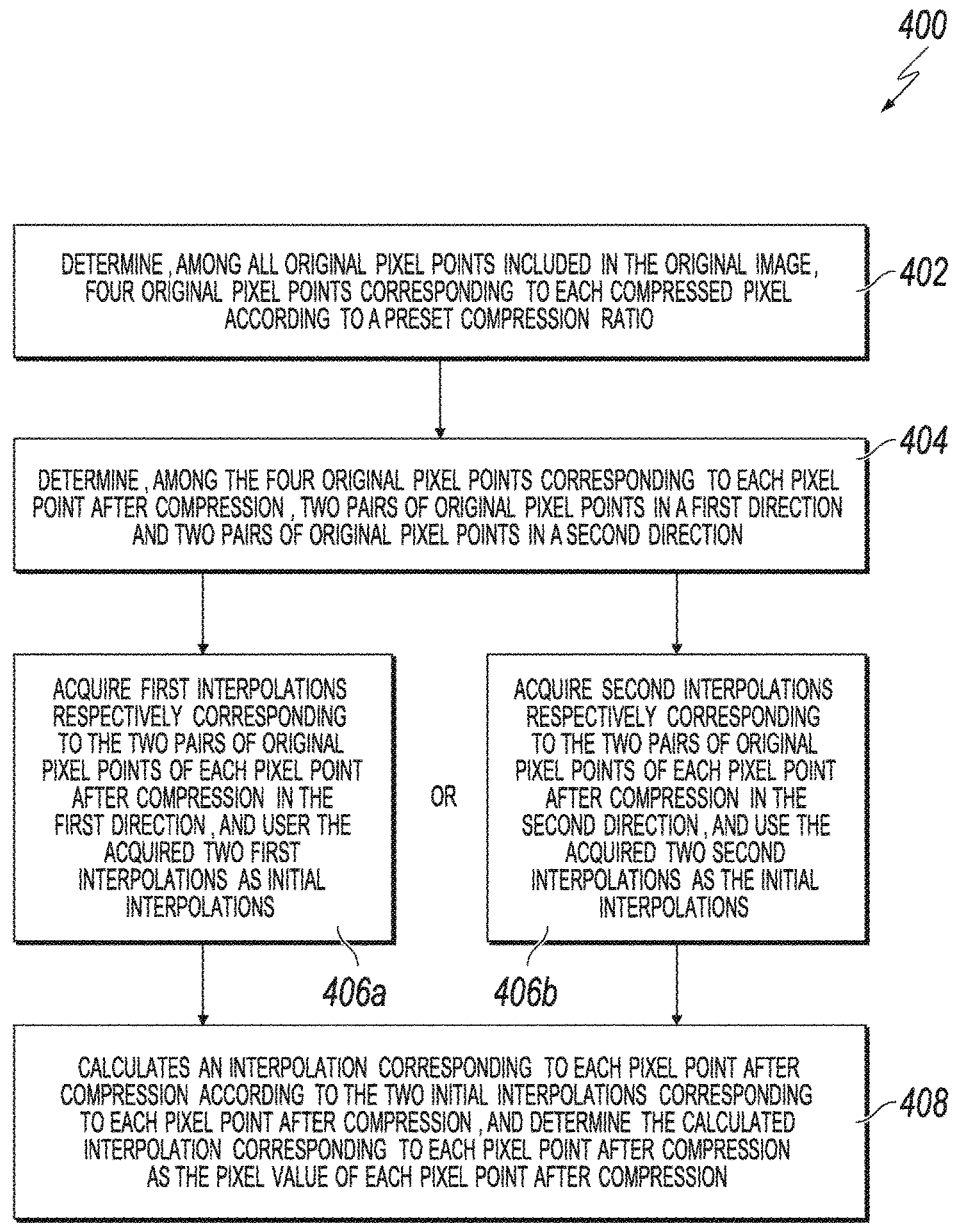
FIG. 4 is a flowchart illustrating an example of a computer-implemented method for generating a low-pixel image, according to an implementation of the present disclosure

FIG. 4 is a flowchart illustrating an example of a computer-implemented method 400 for generating a low-pixel image, according to an implementation of the present disclosure. For example, the low-pixel image can be generated by the image processing device 202 in a process of acquiring a pixel value of each pixel point in the low-pixel image. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, four original pixel points corresponding to each compressed pixel are determined according to a preset compression ratio. The four original pixel points are among all original pixel points included in the original image. For example, the image processing device 202 can determine the four original pixel points.

Figure 5B:
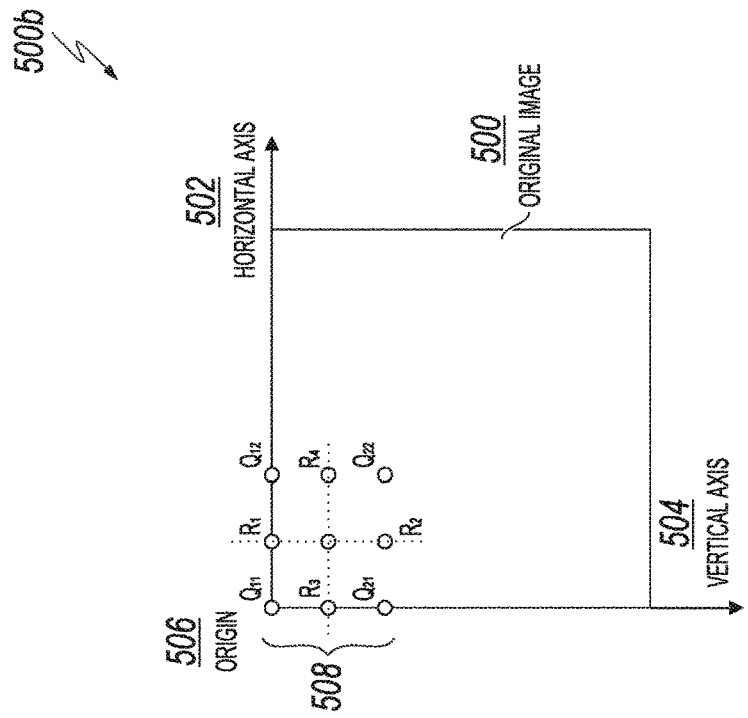
FIGS. 5A and 5B are diagrams illustrating an example of an original image, according to an implementation of the present disclosure.
Figure 5A:
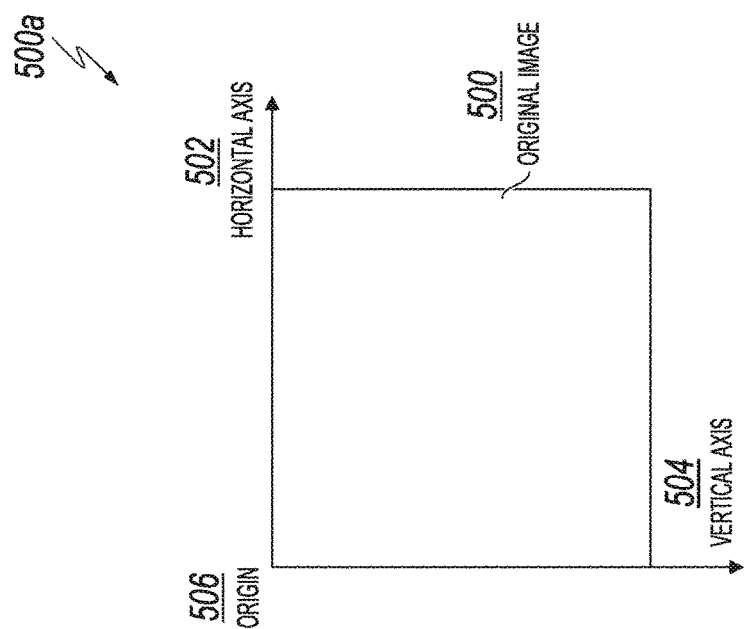

Turning to FIGS. 5A and 5B, FIGS. 5A and 5B are diagrams illustrating an example of an original image 500, according to an implementation of the present disclosure. For example, referring to FIG. 5A, a rectangular coordinate system in the original image 500 can be established by the image processing device 202. Using the coordinate system, a horizontal direction can be used as a horizontal axis 502, a vertical direction perpendicular to the horizontal axis 502 can be used as a vertical axis 504, and a top left corner of the original image 500 can be used as an origin 506. Based on the rectangular coordinate system, the first direction can be the positive direction of the horizontal axis 502, and the second direction can be the positive direction of the vertical axis 504. Alternatively, the first direction is the positive direction of the vertical axis 504, and the second direction can be the positive direction of the horizontal axis 502.

The image processing device 202 can determine, among all the original pixel points included in the original image 500, the four original pixel points corresponding to each pixel point after compression according to a resolution of the original image 500 and the preset compression ratio. The number of original pixel points corresponding to one compressed pixel point can be between the values of one and four, inclusively. The number can be determined according to the preset compression ratio. For example, the preset compression ratio can be 5:2, that is, 5×5 pixel points can be compressed into 2×2 pixel points. Further, the original pixel points corresponding to the first pixel point after compression can be the second pixel point in the second row and the third pixel point in the second row, as well as the second pixel point in the third row and the third pixel point in the third row. In this case, the number of original pixel points corresponding to one compressed pixel point is four. In another example, the preset horizontal compression ratio and longitudinal compression ratio can both be 3:1, that is, 3×3 pixel points can be compressed into one pixel point. Further, the original pixel point corresponding to the first pixel point after compression can be the third pixel point in the third row (3÷1=3). In this case, the number of original pixel points corresponding to one compressed pixel point is one.

In some implementations, for ease of calculation, when the number of original pixel points corresponding to the compressed pixel point is less than four, the number of original pixel points can be extended to four. That is, an original pixel point adjacent to the original pixel points can be determined as the original pixel point corresponding to the compressed pixel point according to the preset compression ratio. A corresponding weight value can be configured for each determined original pixel point, and the pixel value of one compressed pixel point can be determined based on four original pixel points and the corresponding weight values. Returning to FIG. 4, from 402, method 400 proceeds to 404.

At 404, two pairs of original pixel points in a first direction and two pairs of original pixel points in a second direction can be determined among the four original pixel points corresponding to each pixel point after compression. For example, the image processing device 202 can determine, among the four original pixel points corresponding to each pixel point after compression, two pairs of original pixel points in a first direction and two pairs of original pixel points in a second direction. Referring to FIG. 5B, with reference to points 508, if the first direction is the positive direction of the horizontal axis 502, and the second direction is the positive direction of the vertical axis 504, then the two pairs of original pixel points in the first direction can be $Q_{11}$ and $Q_{12}$, as well as $Q_{21}$ and $Q_{22}$, respectively, and the two pairs of original pixel points in the second direction can be $Q_{11}$ and $Q_{21}$, as well as $Q_{12}$ and $Q_{22}$, respectively.

In some implementations, the image processing device 202 divides the four original images corresponding to one compressed pixel point into two pairs. Two original pixel images, among the four original pixel points, that are located in the same row or in the same column, can be used as one pair. For example, if the preset compression ratio is 5:2, the four original pixel points corresponding to the original pixels corresponding to the first pixel point after compression can be the second pixel point in the second row and the third pixel point in the second row, as well as the second pixel point in the third row and the third pixel point in the third row. In this case, the second pixel point in the second row and the third pixel point in the second row are in one pair, and the second pixel point in the third row and the third pixel point in the third row are in one pair. Returning to FIG. 4, from 404, method 400 proceeds to 406a or 406b.

At 406a, the first interpolations are acquired corresponding to the two pairs of original pixel points of each pixel point after compression in the first direction, and the acquired two first interpolations are used as initial interpolations. Alternatively, at 406b, second interpolations are acquired corresponding to the two pairs of original pixel points of each pixel point after compression in the second direction, and the acquired two second interpolations are used as the initial interpolation.

Acquisition of the interpolations can be performed by the image processing device 202. In some implementations, when acquiring the initial interpolations corresponding to each pixel point after compression, the image processing device 202 can employ the following two techniques.

In a first technique, the first interpolations are acquired that correspond to the two pairs of original pixel points of each pixel point after compression in the first direction, and the acquired two interpolations are used as the initial interpolations corresponding to each pixel point after compression. For example, referring again to FIG. 5B, if the first direction is the positive direction of the horizontal axis 502, and the second direction is the positive direction of the vertical axis 504, then the first interpolations can be an interpolation of $Q_{11}$ and $Q_{12}$ and an interpolation of $Q_{21}$ and $Q_{22}$.

In a second technique, the first interpolations can be acquired that correspond to the two pairs of original pixel points of each pixel point after compression in the second direction, and the acquired two interpolations can be used as the initial interpolations corresponding to each pixel point after compression. For example, referring again to FIG. 5B, if the first direction is the positive direction of the horizontal axis 502, and the second direction is the positive direction of the vertical axis 504, then the second interpolations can be an interpolation of $Q_{11}$ and $Q_{21}$ and an interpolation of $Q_{12}$ and $Q_{22}$. Returning to FIG. 4, from 406a or 406b, method 400 proceeds to 408.

At 408, an interpolation corresponding to each pixel point is calculated after compression according to the two initial interpolations corresponding to each pixel point after compression, and the calculated interpolation corresponding to each pixel point are determined after compression. In some implementations, corresponding to the two alternative techniques in steps 406a and 406b, two techniques can be used in acquiring the interpolation corresponding to each pixel point after compression.

In a first technique, the image processing device 202 determines the first interpolations respectively corresponding to the two pairs of original pixel points of each pixel point after compression in the first direction as the initial interpolations corresponding to each pixel point after compression. An interpolation can be calculated from the determined two initial interpolations corresponding to each pixel point after compression in the second direction. The interpolation can be used as the interpolation corresponding to each pixel point after compression. For example, referring again to FIG. 5B, if the first direction is the positive direction of the horizontal axis 502, and the second direction is the positive direction of the vertical axis 504, the initial interpolation of $Q_{11}$ and $Q_{12}$ can be $R_1$ and the initial interpolation of $Q_{21}$ and $Q_{22}$ can be $R_2$. Further, an interpolation of the initial interpolation $R_1$ and the initial interpolation $R_2$ can be calculated, and the calculated interpolation can be determined as the pixel value of the pixel point P after compression of the original pixel points $Q_{11}$, $Q_{12}$, $Q_{21}$, and $Q_{22}$.

In a second technique, the image processing device 202 determines the second interpolations respectively corresponding to the two pairs of original pixel points of each pixel point after compression in the second direction as the initial interpolations corresponding to each pixel point after compression. Then, an interpolation can be calculated from the determined two initial interpolations corresponding to each pixel point after compression in the first direction. The interpolation can be used as the interpolation corresponding to each pixel point after compression. For example, referring again to FIG. 5B, if the first direction is the positive direction of the horizontal axis 502, and the second direction is the positive direction of the vertical axis 504, then the initial interpolation of $Q_{11}$ and $Q_{21}$ can be $R_3$ and the initial interpolation of $Q_{12}$ and $Q_{22}$ can be $R_4$. Further, an interpolation of the initial interpolation $R_3$ and the initial interpolation $R_4$ can be calculated, and the calculated interpolation can be determined as the pixel value of the pixel point P after compression of the original pixel points $Q_{11}$, $Q_{12}$, $Q_{21}$, and $Q_{22}$.

The pixel points in the low-pixel image can be acquired by using a fast bilinear interpolation algorithm according to the pixel values of the original pixel points. The arbitrary $R_i$ can be acquired by using the following equation:

$$R_i = Q_a \times q_a + Q_b \times q_b \quad (1)$$

where $R_i$ is the interpolation; $Q_a$ is a pixel value of a first original pixel point; $q_a$ is a weight value of the first original pixel point, the weight value being acquired according to the preset compression ratio; $Q_b$ is a pixel value of a second original pixel point; and $q_b$ is a weight value of the second original pixel point, the weight value being acquired according to the preset compression ratio.

In some implementations, during calculation of the interpolation corresponding to each pixel point after compression, a weight value of each row of original pixel points and a weight value of each column of original pixel points can be calculated first. Further, the calculated weight value of each row of original pixel points and the calculated weight value of each column of original pixel points can be stored. In this way, in the calculation process of the interpolation, the weight value of an original pixel point can be invoked directly if the row number and column number of the original pixel point are known. Further, it is unnecessary to calculate the weight value of the original pixel point corresponding to each pixel point after compression, which can improve the efficiency of generating the low-pixel image.

In some implementations, during calculation the interpolation corresponding to each pixel point after compression, when a first interpolation or a second interpolation corresponding to an arbitrary compressed pixel point is obtained through calculation, the image processing device 202 can locally buffer the first interpolation or the second interpolation. When original pixel points employed during calculation of an interpolation corresponding to another compressed pixel point are the same as the original pixel points corresponding to the arbitrary compressed pixel point, it is only necessary to directly invoke the first interpolation or second interpolation. In this way, re-calculation is not needed, which can improve the efficiency of acquiring the low-pixel image.

In some implementations, the image processing device 202 can determine the pixel value of each pixel point after compression, and the low-pixel image can be generated according to the position and the pixel value of each pixel point after compression.

In some implementations, the low-pixel image can be converted from a color image into a gray image, and the gray image can be binarized to convert the low-pixel image into a binary image. The binary image includes only two colors, and preferably, one of the two colors has a pixel value of 0 and the other of the two colors has a pixel value of 255. Edge detection processing can be performed on the binary image to acquire at least one edge line included in the binary image, and the edge detection processing may be, for example, Canny edge detection processing. Each edge line can be separately dilated. Then, each acquired edge line can have a crack, and each dilated edge line can connect to acquire connected regions. All the connected regions can be screened according to position information of each connected region respectively to acquire a specific region. The specific region can be a specific graphic portion included in the target image. The portion other than the specific region in the low-pixel image can be determined as the to-be-detected region. The position information can be the position of each of the connected regions in the low-pixel image.

In some implementations, the image processing device 202 can perform edge detection processing on the binary image by using a preset edge detection parameter. The weaker the edge detection parameter is, for example, the more the edge lines are detected. Also, the stronger the edge detection parameter is, the fewer the edge lines are detected. In addition, the image processing device 202 can further dilate each edge line by using a preset dilation parameter, and the dilation parameter can be adapted to the edge detection parameter. When the edge detection parameter is weaker and more edge lines are detected, a smaller dilation parameter can be employed. When the edge detection parameter is stronger and fewer edge lines are detected, a greater dilation parameter can be employed. In some implementations, a preferred dilation parameter can be 5×5 or 3×3.

Screening all the connected regions according to position information of each connected region respectively to acquire a specific region can include the following. Position information of each connected region can be acquired, and a pre-estimated region of the target image can be acquired. Any connected region, among all the connected regions, located within the pre-estimated region can be determined as a specific region. Any connected region, among all the connected regions, located out of the pre-estimated region can be determined as a non-specific region.

Referring again to FIG. 5B, based on the above established rectangular coordinate system, the resolution of the original image can be $a_1 \times a_2$, the preset compression ratio can be q. Thus, the resolution of the generated low-pixel image can be $b_1 \times_2$, where $a_1/b_1 = q$ and $a_2/b_2 = q$. Starting from the origin of the rectangular coordinate system, the first pixel point in the low-pixel image can be P. The first original pixel point of the original image corresponding to the pixel point P can be represented by $Q_{11}$. The second original pixel point of the original image corresponding to the pixel point P can be represented by $Q_{12}$. The third original pixel point of the original image corresponding to the pixel point P can be represented by $Q_{21}$. The fourth original pixel point of the original image corresponding to the pixel point P can be represented by $Q_{22}$. The weight value of each original pixel point can be acquired according to the preset compression ratio. For example, if the preset compression ratio is 5:2, that is, 5×5 pixel points are compressed into 2×2 pixel points, then the four original pixel points corresponding to the original pixels corresponding to the first pixel point after compression can be the second pixel point in the second row and the third pixel point in the second row, as well as the second pixel point in the third row and the third pixel point in the third row. When a distance from the second pixel point in the second row to the compressed pixel point is, for example, 0.5 (an absolute value of 5±2-2), the weight value of the second pixel point in the second row can be 0.5, and the weight values of the other three pixel points can also be 0.5.

The weight value can be a positive integer or a negative integer. When the weight value is a negative integer, a shift operation can be performed on the weight value to acquire a corresponding positive integer, and image processing can be performed according to the acquired positive integer. After the completion of the image processing, the shift operation can be performed again on the position of each pixel point included in the acquired low-pixel image. Also, a correction operation can be performed on each pixel value to enhance the accuracy of the finally acquired target image while ensuring a decreased amount of image processing. Returning to FIG. 4, after 408, method 400 stops.

Figure 6:
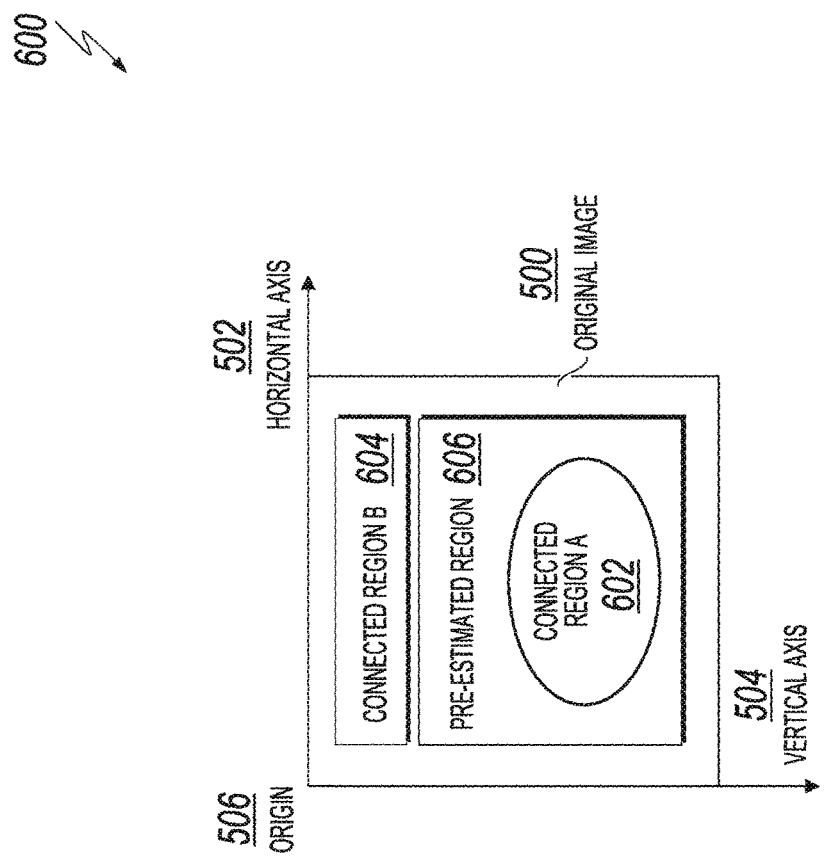
FIG. 6 is a diagram illustrating an example of the original image with connected regions, according to an implementation of the present disclosure.

FIG. 6 is a diagram illustrating an example of the original image 500 with connected regions, according to an implementation of the present disclosure. For example, after image processing is performed on the low-pixel image, a connected region A 602 and a connected region B 604 can be acquired, and a pre-estimated region 606 of the target image can be C. As can be determined from FIG. 6, the connected region A 602 can be located within the pre-estimated region C 606, and the connected region B 604 can be located outside of the pre-estimated region C 606.

In some implementations, before performing the edge detection processing on the binary image, the image processing device 202 can perform Gauss smoothing on the binary image by using a first preset Gauss smoothing parameter. The first preset Gauss smoothing parameter can be preset according to a specific application scenario. For example, the first preset Gauss smoothing parameter can be 5×5 or 3×3. The Gauss smoothing can be performed on the binary image before the edge detection processing is performed on the image. This can result in filtering out a noise texture included in the binary image, avoiding the problem of a decrease in image processing accuracy caused by noise interference, and effectively enhancing the image processing accuracy.

The specific region included in the low-pixel image can be filtered out, and borderline detection can be performed only on the to-be-detected region that does not include the specific region. This can prevent the image processing device 202 from performing unnecessary image processing on a non-region, effectively improving the image processing efficiency. In addition, the image processing device 202 needs only to perform borderline detection on the to-be-detected region that does not include the specific region. This avoids the problem of determining a curve in the specific region as the borderline when a gradient value of a specific graph in the specific region satisfies a borderline detection condition, effectively ensuring the accuracy of acquiring the target image. In some implementations, the image processing device 202 can calculate a gradient value between every two adjacent pixel points in the to-be-detected region, perform edge region detection on the to-be-detected region according to the calculated gradient value, and further determine the borderlines of the target image included in the low-pixel image.

Figure 7:
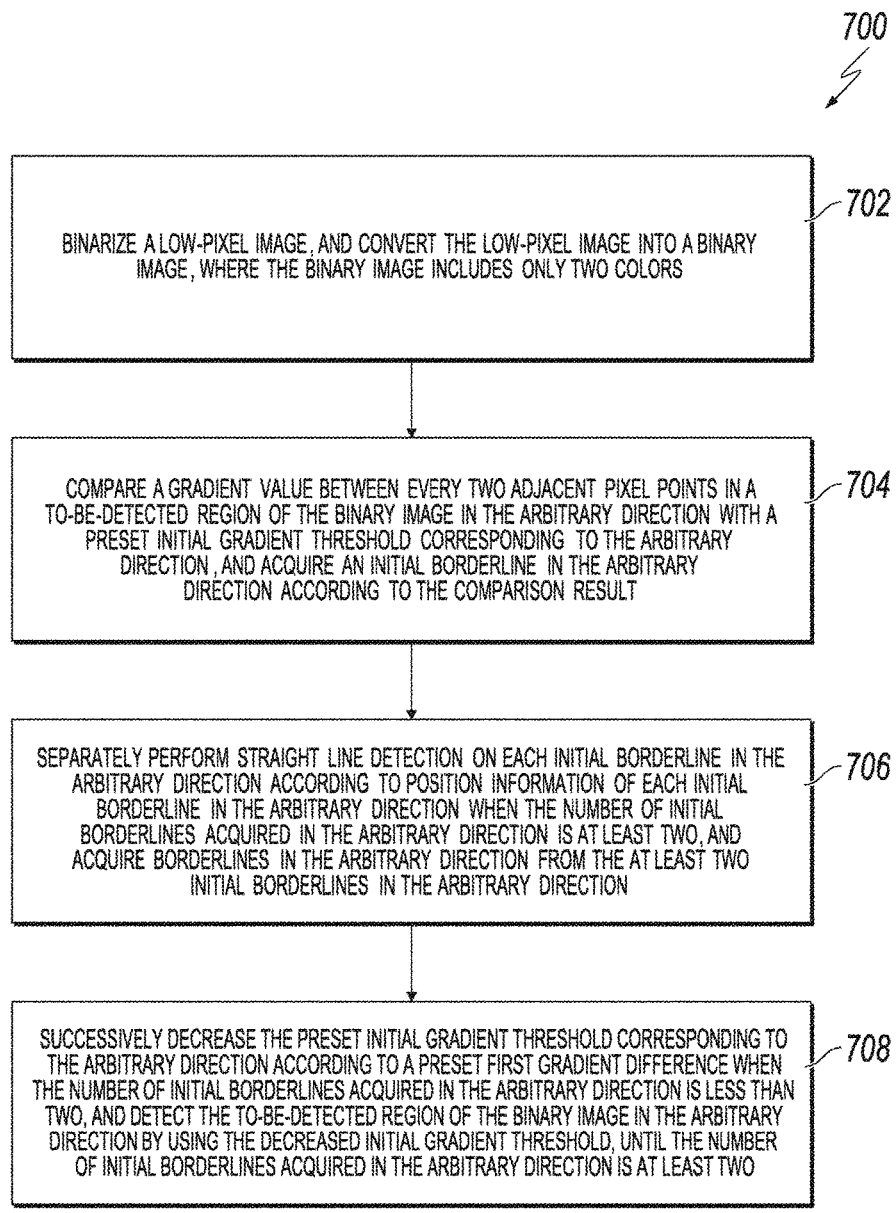
FIG. 7 is a flowchart illustrating an example of a computer-implemented method for determining the borderlines of the target image included in the low-pixel image, according to an implementation of the present disclosure.

FIG. 7 is a flowchart illustrating an example of a computer-implemented method 700 for determining the borderlines of the target image included in the low-pixel image, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, the low-pixel image is binarized, and the low-pixel image is converted into a binary image, where the binary image includes only two colors. For example, the low-pixel image can be converted from a color image into a binary image including only two colors. One of the two colors can have a pixel value of 0 and the other of the two colors can have a pixel value of 255. The image processing device 202 can convert the color low-pixel image into the binary image. This can reduce the complexity of performing borderline detection by using a gradient value, and can increase the image processing efficiency.

In some implementations, acquiring a gradient between every two adjacent pixel points can include the following. For two arbitrary adjacent pixel points that include a first pixel point and a second pixel point, the following are acquired: a first color pixel value ($S_1$), a second color pixel value ($S_2$), and a third color pixel value ($S_3$) of the first pixel point. Further, the following are acquired: a first color pixel value ($U_1$), a second color pixel value ($U_2$), and a third color pixel value ($U_3$) of the second pixel point. The following are separately calculated: an absolute value of a difference between the first color pixel value ($S_1$) of the first pixel point and the first color pixel value ($U_1$) of the second pixel point, an absolute value of a difference between the second color pixel value ($S_2$) of the first pixel point and the second color pixel value ($U_2$) of the second pixel point, and an absolute value of a difference between the third color pixel value ($S_3$) of the first pixel point and the third color pixel value ($U_3$) of the second pixel point. The calculated three absolute values can be used as the gradient value between the first pixel points. In some implementations, the image processing device 202 can calculate the gradient value between two arbitrary adjacent pixel points by using the following equation:

$$T=|S_1-U_1|+|S_2-U_2|+|S_3-U_3| \quad (2)$$

where T is the gradient value between the two arbitrary adjacent pixel points; $S_1$ is the first color pixel value of the first pixel point; $S_2$ is the second color pixel value of the first pixel point; $S_3$ is the third color pixel value of the first pixel point; $U_1$ is the first color pixel value of the second pixel point; $U_2$ is the second color pixel value of the second pixel point; and $U_3$ is the third color pixel value of the second pixel point. The two adjacent pixel points can include two longitudinally-adjacent pixel points or two laterally-adjacent pixel points.

In some implementations, an original image consisting of only three basic colors can be used as an example for introducing the process of calculating the gradient value between every two adjacent pixel points. When the original image includes four or more basic colors, the principle adopted during acquiring the gradient value between every two adjacent pixel points can be the same as that of acquiring the gradient value between every two adjacent pixel points from the original pixel consisting of the three basic colors. From 702, method 700 proceeds to 704.

At 704, a gradient value between every two adjacent pixel points in the to-be-detected region of the binary image in the arbitrary direction is compared with a preset initial gradient threshold corresponding to the arbitrary direction, and an initial borderline is acquired in the arbitrary direction according to the comparison result. These operations can happen in any order.

In some implementations, the target image can be a closed quadrangle. For example, the terminal can separately compare the gradient value between every two adjacent pixel points in the to-be-detected region of the binary image in the arbitrary direction with the preset initial gradient threshold corresponding to the arbitrary direction. When gradient values between adjacent pixel points in any group of adjacent pixel points along the arbitrary direction are all greater than the preset initial gradient threshold, a line can be determined that is composed of one group of pixel points in the group of adjacent pixel points as the borderline in the arbitrary direction. The arbitrary direction can be a first direction or a second direction. In a first case, the first direction can be a direction from an origin along the positive direction of the horizontal axis, and the second direction can be a direction from the origin along the positive direction of the vertical axis. Alternatively, in a second case, the first direction can be a direction from the origin along the positive direction of the vertical axis, and the second direction can be a direction from the origin along the positive direction of the horizontal axis.

If the first case is used, then during acquisition of the borderline in the first direction, the image processing device 202 can calculate a gradient value between every two longitudinally-adjacent pixel points in the binary image. The image processing device 202 can then compare the acquired gradient value with a first initial gradient threshold. The image processing device 202 can then determine, when the gradient value between every two longitudinally-adjacent pixel points among all the pixel points in two arbitrary adjacent rows reaches the first initial gradient threshold, that a line formed by the upper row of pixel points in the two arbitrary adjacent rows is one initial borderline in the first direction. When a gradient value between any two longitudinally-adjacent pixel points among all the pixel points in the two arbitrary adjacent rows does not reach the first initial gradient threshold, the image processing device 202 can continue to detect whether gradient values between the next two adjacent rows of pixel points all meet the borderline detection condition. Similarly, during acquisition of the borderline in the second direction, the image processing device 202 can calculate a gradient value between every two laterally-adjacent pixel points in the binary image, and compare the acquired gradient value with a second initial gradient threshold, and determine. Then, when the gradient value between every two laterally-adjacent pixel points among all the pixel points in two arbitrary adjacent columns reaches the second initial gradient threshold, a line on the left of the two arbitrary adjacent columns can be used as one initial borderline in the second direction. When a gradient value between any two laterally-adjacent pixel points among all the pixel points in the two arbitrary adjacent columns does not reach the second initial gradient threshold, then the image processing system can continue to detect whether gradient values between the next two adjacent columns of pixel points all meet the borderline detection condition.

If the second case is used, the image processing device 202 can calculate a gradient value between every two laterally-adjacent pixel points in the binary image. The image processing device 202 can then compare the acquired gradient value with a first initial gradient threshold. When the gradient value between every two laterally-adjacent pixel points among all the pixel points in two arbitrary adjacent columns reaches the first initial gradient threshold, then a line on the left of the two arbitrary adjacent columns can be used as one initial borderline in the first direction. When a gradient value between any two laterally-adjacent pixel points among all the pixel points in the two arbitrary adjacent columns does not reach the first initial gradient threshold, then the image processing device 202 can continue to detect whether gradient values between the next two adjacent columns of pixel points can all meet the borderline detection condition. Similarly, during acquisition of the borderline in the second direction, the image processing device 202 can calculate a gradient value between every two longitudinally-adjacent pixel points in the binary image. The image processing device 202 can then compare the acquired gradient value with a second initial gradient threshold. When the gradient value between every two longitudinally-adjacent pixel points among all the pixel points in two arbitrary adjacent rows reaches the second initial gradient threshold, the image processing device 202 can then determine that a line in the upper row of the two arbitrary adjacent rows is one initial borderline in the second direction. When a gradient value between any two longitudinally-adjacent pixel points among all the pixel points in the two arbitrary adjacent rows does not reach the second initial gradient threshold, the image processing device 202 can continue to detect whether gradient values between the next two adjacent rows of pixel points all meet the borderline detection condition. Values of the first initial gradient threshold and the second initial gradient threshold can be preset according to specific application scenarios, and the values may or may not be equal.

Figure 8:
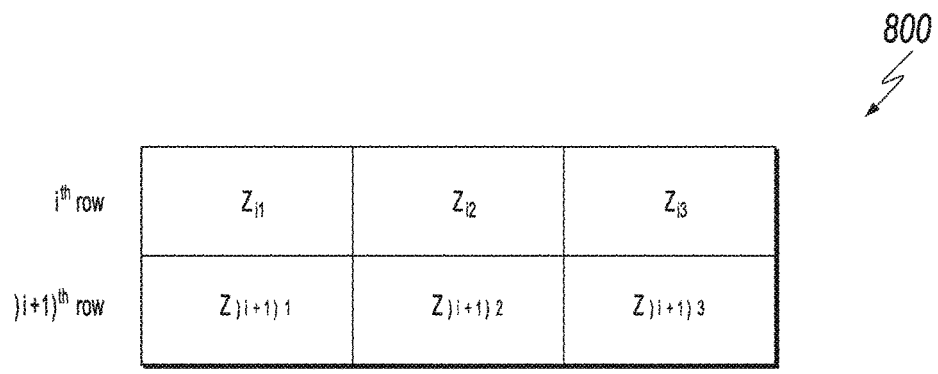
FIG. 8 is a diagram illustrating example values for pixel points, according to an implementation of the present disclosure.

FIG. 8 is a block diagram illustrating example values for pixel points, according to an implementation of the present disclosure. For example, the values can be used in the detection of a borderline in the first direction when the first direction is the positive direction of the horizontal axis. As an example, the $i^{th}$ row and the $(i+1)^{th}$ row in the binary image are two adjacent rows. Each row includes three pixel points, as in the following. The $i^{th}$ row includes pixel points $Z_{i1}$, $Z_{i2}$, and $Z_{i3}$. The $(i+1)^{th}$ row includes pixel points $Z_{(i+1)1}$, $Z_{(i+1)2}$, and $Z_{(i+1)3}$. The first initial gradient threshold is T. $Z_{i1}$ and $Z_{(i+1)1}$ are two longitudinally-adjacent pixel points, $Z_{i2}$ and $Z_{(i+1)2}$ are two longitudinally-adjacent pixel points, $Z_{i3}$ and $Z_{(i+1)3}$ are two longitudinally-adjacent pixel points. The gradient value between the pixel point $Z_{i1}$ and the pixel point $Z_{(i+1)1}$ is $T_1$. The gradient value between the pixel point $Z_{i2}$ and the pixel point $Z_{(i+1)2}$ is $T_2$. The gradient value between the pixel point $Z_{i3}$ and the pixel point $Z_{(i+1)3}$ is $T_3$. When $T_1$, $T_2$, and $T_3$ are all greater than or equal to T, the $i^{th}$ row is determined as a borderline in the first direction. When at least one of $T_1$, $T_2$, and $T_3$ is smaller than T, it is continuously detected whether a borderline meeting the borderline condition exists between the $(i+1)^{th}$ row and the $(i+2)^{th}$ row. In some implementations, when detecting the borderline, the image processing device 202 can implement borderline detection by using a continuous Hough transform algorithm.

In some implementations, the image processing device 202, before performing borderline detection on the to-be-detected region in the binary image, can further perform Gauss smoothing on the binary image by using a second preset Gauss smoothing parameter. The second preset Gauss smoothing parameter can be preset according to a specific application scenario. For example, the first preset Gauss smoothing parameter can be 5×5 or 3×3. The Gauss smoothing can be performed on the binary image before the edge detection processing is performed on the image. This can filter out a noise texture included in the binary image, avoiding the problem of a decrease in image processing accuracy caused by noise interference and effectively enhancing the image processing accuracy. From 704, method 700 proceeds to 706.

At 706, straight line detection is separately performed on each initial borderline in the arbitrary direction according to position information of each initial borderline in the arbitrary direction when the number of initial borderlines acquired in the arbitrary direction is at least two, and borderlines are acquired in the arbitrary direction from the at least two initial borderlines in the arbitrary direction. For example, the image processing device 202 can determine whether the number of initial borderlines acquired in an arbitrary direction is greater than or equal to two. Screening can be performed on the initial borderlines according to a position of each initial borderline when the number of initial borderlines acquired in the arbitrary direction is greater than or equal to two. In this way, borderlines can be selected in the arbitrary direction from all the initial borderlines.

In some implementations, in the borderline detection process of the target image, when the detection result is that at least two initial borderlines in the first direction and at least two initial borderlines in the second direction are obtained, straight line detection can be separately performed on each initial borderline in the first direction according to position information of each initial borderline in the first direction. Doing so can result in acquiring two borderlines in the first direction from the at least two initial borderlines in the first direction. Straight line detection can be separately performed on each initial borderline in the second direction according to position information of each initial borderline in the second direction. Doing so can result in acquiring two borderlines in the second direction from the at least two initial borderlines in the second direction.

In some implementations, the image processing device 202 can detect borderlines in different directions to obtain multiple initial borderlines. Because the multiple initial borderlines may have an interference factor, such as a background image, the multiple initial borderlines may not all be borderlines of the target image. As a result, it can be necessary to detect all the acquired initial borderlines to determine the borderlines of the target image.

In some implementations, the image processing device 202 can execute the following operations for each initial borderline. The image processing device 202 can acquire position information of the initial borderline. The position information includes a distance of the initial borderline in the low-pixel image from the horizontal axis and a distance from the vertical axis. The image processing device 202 can acquire a pre-estimated region of the target image and can compare the position information of the initial borderline with the pre-estimated region. When a successful matching occurs between the position information of the initial borderline and the pre-estimated region, the initial borderline can be determined as a borderline of the target image. When the matching between the position information of the initial borderline and the pre-estimated region is unsuccessful, it can be determined that the initial borderline is not a borderline of the target image. Successful matching between the position information of the initial borderline and the pre-estimated region can be determined as being successful when the distance of the initial borderline from the horizontal axis is equal to a distance of an arbitrary borderline of the pre-estimated region from the horizontal axis. In another example, successful matching between the position information of the initial borderline and the pre-estimated region can be determined as being successful when the distance of the initial borderline from the vertical axis is equal to a distance of an arbitrary borderline of the pre-estimated region from the vertical axis.

In some implementations, when multiple initial borderlines still exist after the screening of the initial borderlines, the image processing device 202 can acquire a length of a line segment in each initial borderline between intersection points after the initial borderlines intersect with each other. The image processing device 202 can then screen out, from the multiple initial borderlines according to a ratio between sides of the target image, initial borderlines to serve as the borderlines of the target image. The borderlines that are screened out can be borderlines that occur in different directions, meet the ratio between sides of the target image, and have intersecting points. For example, the target image can be an ID card image, the ID card can have a length-width ratio of 4:3, the length of the first initial borderline in the first direction acquired by the image processing device 202 can be 8 centimeters (cm), and the length of the second initial borderline in the second direction and intersecting with the first initial borderline can be 4 cm. Because the length ratio of the first initial borderline to the second initial borderline is unequal to 4:3, the first initial borderline and the second initial borderline are not the borderlines of the target image. The length of the third initial borderline in the first direction acquired by the image processing device 202 can be 8 cm, and the length of the fourth initial borderline in the second direction and intersecting with the first initial borderline can be 6 cm. Because the length ratio of the first initial borderline to the second initial borderline is equal to 4:3, the first initial borderline and the second initial borderline can be the borderlines of the target image. From 706, method 700 proceeds to 708.

At 708, the preset initial gradient threshold corresponding to the arbitrary direction can be successively decreased according to a preset first gradient difference when the number of initial borderlines acquired in the arbitrary direction is less than two. Also, the to-be-detected region of the binary image can be detected in the arbitrary direction by using the decreased initial gradient threshold until the number of initial borderlines acquired in the arbitrary direction is no less than two.

In some implementations, the preset initial gradient threshold can be decreased when the number of initial borderlines acquired in the arbitrary direction is less than a preset number. Also, edge region detection can be performed again by using the decreased initial gradient threshold. When the number of borderlines that can be acquired in the arbitrary direction is still less than two, the process can be repeated to decrease the preset initial gradient threshold again. The process can be repeated until the number of initial borderlines acquired in the arbitrary direction is no less than two. Screening can be performed on the initial borderlines according to the position of each initial borderline to select borderlines in the arbitrary direction from all the initial borderlines.

In some implementations, in the borderline detection process of the target image, when the detection result is that at least two initial borderlines in first direction cannot be acquired, the first initial gradient threshold can successively decrease according to a preset first gradient difference. Successively decreasing the first initial gradient threshold can occur until the number of initial borderlines acquired in the first direction is at least two. If multiple initial borderlines are acquired in the first direction, straight line detection can be separately performed on each initial borderline in the first direction according to the position information of each initial borderline in the first direction. Performing the straight line detection can acquire two borderlines in the first direction from the multiple initial borderlines in the first direction. Similarly, when the detection result is that at least two initial borderlines in the second direction cannot be acquired, the second initial gradient threshold can be successively decreased according to a preset second gradient difference. This can occur until at least two initial borderlines in the second direction are acquired. If multiple initial borderlines in the second direction are acquired, straight line detection can be separately performed on each initial borderline in the second direction according to the position information of each initial borderline in the second direction. The straight line detection can result in acquiring two borderlines in the second direction from the multiple initial borderlines in the second direction.

In some implementations, if the first direction can be the positive direction of the horizontal axis, then the second direction can be the positive direction of the vertical axis. After successively calculating a gradient between every two adjacent rows of pixel points in the first direction, the image processing device 202 can determine that there is no gradient value between any two adjacent rows of pixel points that meets a preset first gradient threshold. The image processing device 202 can then decrease the first initial gradient threshold according to a preset first gradient difference, and repeat the process. When the image processing device 202 is able to acquire two initial borderlines in the first direction according to the decreased gradient threshold, the process can be terminated. When the image processing device 202 is unable to acquire two initial borderlines in the first direction according to the decreased gradient threshold, the first initial gradient threshold can be decreased according to the preset first gradient difference again. This can occur until two initial borderlines in the first direction are acquired according to the decreased gradient threshold. Similarly, after successively calculating a gradient between every two adjacent columns of pixel points in the second direction, when the image processing device 202 determines that there is no gradient value between any two adjacent columns of pixel points that meets a preset second gradient threshold, the image processing device 202 can decrease the second initial gradient threshold according to a preset second gradient difference. The image processing device 202 can then repeat the process. When the image processing device 202 is able to acquire two initial borderlines in the second direction according to the decreased gradient threshold, the process can be terminated. When the image processing device 202 is unable to acquire two initial borderlines in the second direction according to the decreased gradient threshold, the image processing device 202 can decrease the second initial gradient threshold again according to the preset second gradient difference. This can occur until two initial borderlines in the second direction are acquired according to the decreased gradient threshold.

In some implementations, the first direction can be the positive direction of the vertical axis, and the second direction can be the positive direction of the horizontal axis. In this case, the borderlines of the target image can be the same as the borderlines in the case in which the first direction is the positive direction of the horizontal axis and the second direction is the positive direction of the vertical axis.

In some implementations, the first preset gradient difference can be a preset value according to a specific application scenario. For example, the value can be 10.

In some implementations, after the target image included in the original image is acquired, the target image can be corrected by using a projective transformation algorithm. For example, as a result of a shooting angle used in acquiring an image, the shape of the target image in the original image can have some differences with the shape of the target object. For example, the target object can be an ID card, the shape of which is a rectangle, while the target image can be a parallel quadrangle. The image processing device 202 can correct the target image by using a projective transformation algorithm. For example, an arbitrary intersection point among all the intersection points can be used as a vertex. A distance between the vertex and an arbitrary adjacent vertex can be used as an arbitrary side length of the target image. Other vertices of the target image can be determined according to a length-width ratio of the target image. After all the vertices are connected successively, the graph that is formed can be the corrected target image.

In some implementations, the original image can be a color image or a gray image, for example, in which the form of the original image is not limited and high universality is present. Moreover, the initial borderline of the target image can be determined according to the gradient value between two adjacent pixel points, and the acquired initial borderlines can be screened according to the shape of the target object and the position information of the acquired initial borderlines. This determines the borderlines of the target image, thus avoiding the problem of interference from a background image on the target image when the background image is quite similar to the target image, and ensuring the accuracy of the acquired target image. In addition, when the image processing device 202 is a mobile terminal, the process of acquiring the target image and the correction process may only require 600 milliseconds (ms). After 708, method 700 stops.

Figure 9:
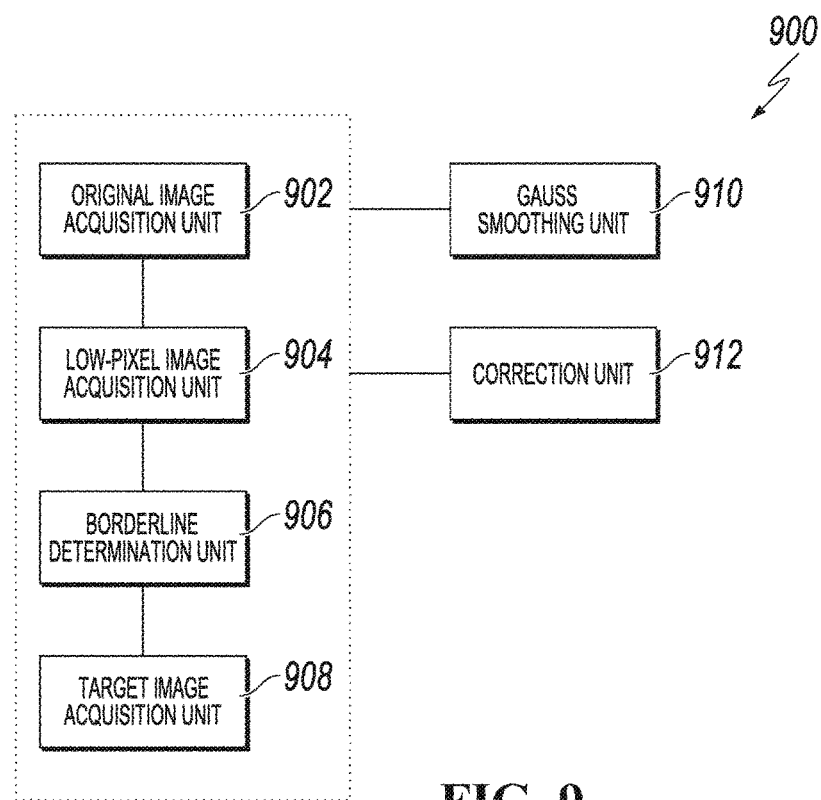
FIG. 9 is a block diagram illustrating an example of an image acquisition system, according to an implementation of the present disclosure.

FIG. 9 is a block diagram illustrating an example of an image acquisition system 900, according to an implementation of the present disclosure. The image acquisition system 900 includes an original image acquisition unit 902, a low-pixel image acquisition unit 904, a borderline determination unit 906, and a target image acquisition unit 908.

The original image acquisition unit 902 is configured to acquire an original image that includes a target image. The low-pixel image acquisition unit 904 is configured to perform image compression processing on the original image according to a preset compression ratio and to acquire a low-pixel image after image compression processing. The borderline determination unit 906 is configured to determine borderlines of the target image in the low-pixel image. The target image acquisition unit 908 is configured to map the determined borderlines included in the low-pixel image into the original image, and to acquire the target image included in the original image.

The low-pixel image acquisition unit 904 is configured to: determine a position of each pixel point after compression according to the preset compression ratio; perform image compression processing on the original image by using a fast bilinear interpolation algorithm to acquire a pixel value of each pixel point after compression; and generate the low-pixel image according to the pixel value and the position each pixel point after compression.

In some implementations, performing image compression processing includes: determining, among all original pixel points included in the original image, four original pixel points corresponding to each pixel point after compression according to the preset compression ratio; determining, among the four original pixel points corresponding to each pixel point after compression, two pairs of original pixel points in a first direction and two pairs of original pixel points in a second direction, where the first direction is a horizontal direction and the second direction is a vertical direction, or where the first direction is a vertical direction and the second direction is a horizontal direction; acquiring first interpolations respectively corresponding to the two pairs of original pixel points of each pixel point after compression in the first direction, and taking the acquired two first interpolations as initial interpolations, or acquiring second interpolations respectively corresponding to the two pairs of original pixel points of each pixel point after compression in the second direction, and taking the acquired two second interpolations as initial interpolations; and calculating an interpolation corresponding to each pixel point after compression according to the initial interpolations corresponding to each pixel point after compression, and determining the pixel value of each pixel point after compression according to the calculated interpolation corresponding to each pixel point after compression.

In some implementations, the borderline determination unit 906 is further configured to: determine a to-be-detected region from the low-pixel image; and perform borderline detection processing on the to-be-detected region according to a gradient value between every two adjacent pixel points in the to-be-detected region to determine the borderlines of the target image.

In some implementations, determining the to-be-detected region from the low-pixel image includes: binarizing the low-pixel image to convert the low-pixel image into a binary image, where the binary image includes only two colors; performing edge detection processing on the binary image to acquire at least one edge line included in the binary image; separately dilating each edge line; connecting each dilated edge line to acquire connected regions; screening the connected regions according to position information of each connected region respectively to acquire a specific region, where the specific region is a region including a specific graphic portion in the target image; and determining a region other than the specific region in the low-pixel image as the to-be-detected region.

In some implementations, the image acquisition system 900 further includes a Gauss smoothing unit 910 that is configured to perform Gauss smoothing on the binary image by using a preset Gauss smoothing parameter before the edge detection processing is performed on the binary image. In some implementations, performing borderline detection on the to-be-detected region includes: binarizing the low-pixel image to convert the low-pixel image into a binary image, where the binary image includes only two colors; and executing the following operations in an arbitrary direction: separately comparing a gradient value between every two adjacent pixel points in the to-be-detected region of the binary image in the arbitrary direction with a preset initial gradient threshold corresponding to the arbitrary direction, and acquiring an initial borderline in the arbitrary direction according to the comparison result; and determining the borderlines of the target image respectively according to the number of initial borderlines acquired in each direction.

In some implementations, determining the borderlines of the target image respectively according to the number of initial borderlines acquired in each direction includes executing the following operations for the detection result in an arbitrary direction: separately performing straight line detection on each initial borderline in the arbitrary direction according to position information of each initial borderline in the arbitrary direction when the number of initial borderlines acquired in the arbitrary direction is at least two to acquire borderlines in the arbitrary direction from at least two initial borderlines in the arbitrary direction; and successively decreasing the preset initial gradient threshold corresponding to the arbitrary direction according to a preset first gradient difference when the number of initial borderlines acquired in the arbitrary direction is less than two, and detecting the to-be-detected region of the binary image in the arbitrary direction by using the decreased initial gradient threshold until the number of initial borderlines acquired in the arbitrary direction is at least two.

In some implementations, the target image acquisition unit 908 is configured to: acquire an intersection point of every two adjacent borderlines included in the low-pixel image; separately map the acquired intersection points into the original image according to the preset compression ratio; and successively connect the points mapped into the original image and determine a quadrangle generated after the connection as the target image included in the original image.

In some implementations, the image acquisition system 900 further includes a correction unit 912 configured to correct the target image by using a projective transformation algorithm after the target image included in the original image is acquired. The image acquisition system 900 can be included, in whole or in part, in the image processing device 202.

Figure 10:
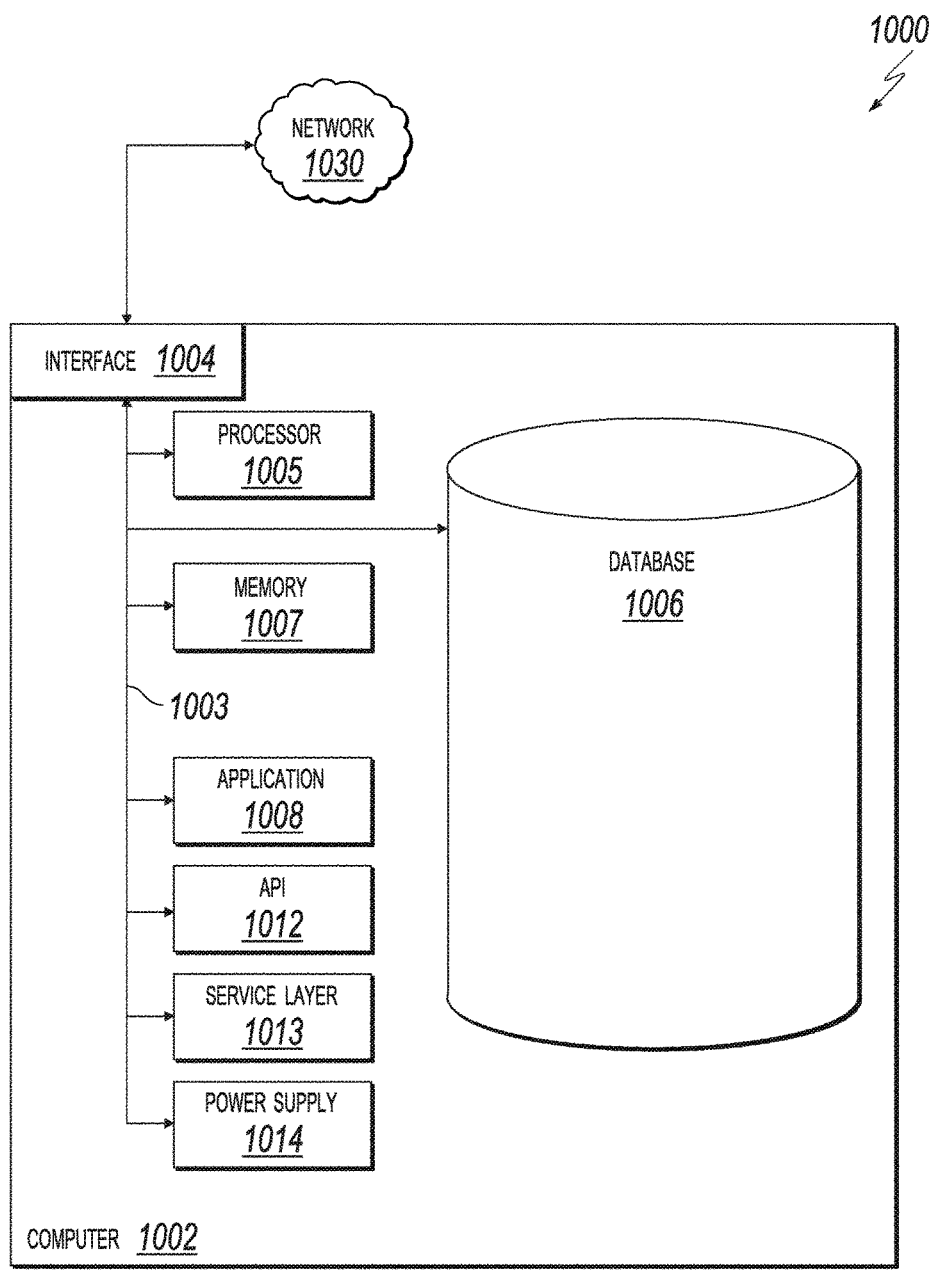
FIG. 10 is a block diagram illustrating an example of a computer-implemented system used to provide computational functionalities associated with described algorithms, methods, functions, processes, flows, and procedures, according to an implementation of the present disclosure.

FIG. 10 is a block diagram illustrating an example of a computer-implemented System 1000 used to provide computational functionalities associated with described algorithms, methods, functions, processes, flows, and procedures, according to an implementation of the present disclosure. In the illustrated implementation, System 1000 includes a Computer 1002 and a Network 1030.

The illustrated Computer 1002 is intended to encompass any computing device such as a server, desktop computer, laptop/notebook computer, wireless data port, smart phone, personal data assistant (PDA), tablet computer, one or more processors within these devices, another computing device, or a combination of computing devices, including physical or virtual instances of the computing device, or a combination of physical or virtual instances of the computing device.

Additionally, the Computer 1002 can include an input device, such as a keypad, keyboard, touch screen, another input device, or a combination of input devices that can accept user information, and an output device that conveys information associated with the operation of the Computer 1002, including digital data, visual, audio, another type of information, or a combination of types of information, on a graphical-type user interface (UI) (or GUI) or other UI.

The Computer 1002 can serve in a role in a distributed computing system as a client, network component, a server, a database or another persistency, another role, or a combination of roles for performing the subject matter described in the present disclosure. The illustrated Computer 1002 is communicably coupled with a Network 1030. In some implementations, one or more components of the Computer 1002 can be configured to operate within an environment, including cloud-computing-based, local, global, another environment, or a combination of environments.

At a high level, the Computer 1002 is an electronic computing device operable to receive, transmit, process, store, or manage data and information associated with the described subject matter. According to some implementations, the Computer 1002 can also include or be communicably coupled with a server, including an application server, e-mail server, web server, caching server, streaming data server, another server, or a combination of servers.

The Computer 1002 can receive requests over Network 1030 (for example, from a client software application executing on another Computer 1002) and respond to the received requests by processing the received requests using a software application or a combination of software applications. In addition, requests can also be sent to the Computer 1002 from internal users (for example, from a command console or by another internal access method), external or third-parties, or other entities, individuals, systems, or computers.

Each of the components of the Computer 1002 can communicate using a System Bus 1003. In some implementations, any or all of the components of the Computer 1002, including hardware, software, or a combination of hardware and software, can interface over the System Bus 1003 using an application programming interface (API) 1012, a Service Layer 1013, or a combination of the API 1012 and Service Layer 1013. The API 1012 can include specifications for routines, data structures, and object classes. The API 1012 can be either computer-language independent or dependent and refer to a complete interface, a single function, or even a set of APIs. The Service Layer 1013 provides software services to the Computer 1002 or other components (whether illustrated or not) that are communicably coupled to the Computer 1002. The functionality of the Computer 1002 can be accessible for all service consumers using the Service Layer 1013. Software services, such as those provided by the Service Layer 1013, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the Computer 1002, alternative implementations can illustrate the API 1012 or the Service Layer 1013 as stand-alone components in relation to other components of the Computer 1002 or other components (whether illustrated or not) that are communicably coupled to the Computer 1002. Moreover, any or all parts of the API 1012 or the Service Layer 1013 can be implemented as a child or a sub-module of another software module, enterprise application, or hardware module without departing from the scope of the present disclosure.

The Computer 1002 includes an Interface 1004. Although illustrated as a single Interface 1004, two or more Interfaces 1004 can be used according to particular needs, desires, or particular implementations of the Computer 1002. The Interface 1004 is used by the Computer 1002 for communicating with another computing system (whether illustrated or not) that is communicatively linked to the Network 1030 in a distributed environment. Generally, the Interface 1004 is operable to communicate with the Network 1030 and includes logic encoded in software, hardware, or a combination of software and hardware. More specifically, the Interface 1004 can include software supporting one or more communication protocols associated with communications such that the Network 1030 or hardware of Interface 1004 is operable to communicate physical signals within and outside of the illustrated Computer 1002.

The Computer 1002 includes a Processor 1005. Although illustrated as a single Processor 1005, two or more Processors 1005 can be used according to particular needs, desires, or particular implementations of the Computer 1002. Generally, the Processor 1005 executes instructions and manipulates data to perform the operations of the Computer 1002 and any algorithms, methods, functions, processes, flows, and procedures as described in the present disclosure.

The Computer 1002 also includes a Database 1006 that can hold data for the Computer 1002, another component communicatively linked to the Network 1030 (whether illustrated or not), or a combination of the Computer 1002 and another component. For example, Database 1006 can be an in-memory, conventional, or another type of database storing data consistent with the present disclosure. In some implementations, Database 1006 can be a combination of two or more different database types (for example, a hybrid in-memory and conventional database) according to particular needs, desires, or particular implementations of the Computer 1002 and the described functionality. Although illustrated as a single Database 1006, two or more databases of similar or differing types can be used according to particular needs, desires, or particular implementations of the Computer 1002 and the described functionality. While Database 1006 is illustrated as an integral component of the Computer 1002, in alternative implementations, Database 1006 can be external to the Computer 1002.

The Computer 1002 also includes a Memory 1007 that can hold data for the Computer 1002, another component or components communicatively linked to the Network 1030 (whether illustrated or not), or a combination of the Computer 1002 and another component. Memory 1007 can store any data consistent with the present disclosure. In some implementations, Memory 1007 can be a combination of two or more different types of memory (for example, a combination of semiconductor and magnetic storage) according to particular needs, desires, or particular implementations of the Computer 1002 and the described functionality. Although illustrated as a single Memory 1007, two or more Memories 1007 or similar or differing types can be used according to particular needs, desires, or particular implementations of the Computer 1002 and the described functionality. While Memory 1007 is illustrated as an integral component of the Computer 1002, in alternative implementations, Memory 1007 can be external to the Computer 1002.

The Application 1008 is an algorithmic software engine providing functionality according to particular needs, desires, or particular implementations of the Computer 1002, particularly with respect to functionality described in the present disclosure. For example, Application 1008 can serve as one or more components, modules, or applications. Further, although illustrated as a single Application 1008, the Application 1008 can be implemented as multiple Applications 1008 on the Computer 1002. In addition, although illustrated as integral to the Computer 1002, in alternative implementations, the Application 1008 can be external to the Computer 1002.

The Computer 1002 can also include a Power Supply 1014. The Power Supply 1014 can include a rechargeable or non-rechargeable battery that can be configured to be either user- or non-user-replaceable. In some implementations, the Power Supply 1014 can include power-conversion or management circuits (including recharging, standby, or another power management functionality). In some implementations, the Power Supply 1014 can include a power plug to allow the Computer 1002 to be plugged into a wall socket or another power source to, for example, power the Computer 1002 or recharge a rechargeable battery.

There can be any number of Computers 1002 associated with, or external to, a computer system containing Computer 1002, each Computer 1002 communicating over Network 1030. Further, the term "client," "user," or other appropriate terminology can be used interchangeably, as appropriate, without departing from the scope of the present disclosure. Moreover, the present disclosure contemplates that many users can use one Computer 1002, or that one user can use multiple computers 1002.

Described implementations of the subject matter can include one or more features, alone or in combination.

For example, in a first implementation, a computer-implemented method comprising: acquiring an original image, wherein the original image comprises a target image; performing image compression processing on the original image according to a preset compression ratio, and creating a low-pixel image based on the image compression processing; determining borderlines of the target image in the low-pixel image; and mapping the determined borderlines of the low-pixel image into the original image, and creating a target image from the original image.

The foregoing and other described implementations can each, optionally, include one or more of the following features:

A first feature, combinable with any of the following features, performing image compression processing on the original image comprises: determining a position of each pixel point after compression according to the preset compression ratio; performing image compression processing on the original image by using a fast bilinear interpolation algorithm, and acquiring a pixel value of each pixel point after compression; and generating the low-pixel image according to the pixel value and the position of each pixel point after compression.

A second feature, combinable with any of the previous or following features, performing image compression processing on the original image using the fast bilinear interpolation algorithm and acquiring a pixel value of each pixel point after compression comprises: determining, among all original pixel points in the original image, four original pixel points corresponding to each pixel point after compression according to the preset compression ratio; determining, among the four original pixel points corresponding to each pixel point after compression, two pairs of original pixel points in a first direction and two pairs of original pixel points in a second direction, wherein the first direction is a horizontal direction and the second direction is a vertical direction, or the first direction is a vertical direction and the second direction is a horizontal direction; acquiring first interpolations respectively corresponding to the two pairs of original pixel points of each pixel point after compression in the first direction, and taking the acquired two first interpolations as initial interpolations; or, acquiring second interpolations respectively corresponding to the two pairs of original pixel points of each pixel point after compression in the second direction, and taking the acquired two second interpolations as initial interpolations; and calculating an interpolation corresponding to each pixel point after compression according to the initial interpolations corresponding to each pixel point after compression, and determining the pixel value of each pixel point after compression according to the calculated interpolation corresponding to each pixel point after compression.

A third feature, combinable with any of the previous or following features, determining borderlines of the target image in the low-pixel image comprises: determining a to-be-detected region from the low-pixel image; and performing borderline detection processing on the to-be-detected region according to a gradient value between every two adjacent pixel points in the to-be-detected region to determine the borderlines of the target image.

A fourth feature, combinable with any of the previous or following features, determining the to-be-detected region from the low-pixel image comprises: binarizing the low-pixel image to convert the low-pixel image into a binary image, wherein the binary image comprises only two colors; performing edge detection processing on the binary image to acquire at least one edge line in the binary image; separately dilating each edge line; connecting each dilated edge line to acquire connected regions; screening the connected regions according to position information of each connected region respectively to acquire a specific region, wherein the specific region is a region comprising a specific graphic portion in the target image; and determining a region other than the specific region in the low-pixel image as the to-be-detected region.

A fifth feature, combinable with any of the previous or following features, before the performing edge detection processing on the binary image, performing Gauss smoothing on the binary image by using a preset Gauss smoothing parameter.

A sixth feature, combinable with any of the previous or following features, performing borderline detection processing on the to-be-detected region according to a gradient value between every two adjacent pixel points in the to-be-detected region, to determine the borderlines of the target image comprises: binarizing the low-pixel image to convert the low-pixel image into a binary image, wherein the binary image comprises only two colors; executing the following operations in an arbitrary direction: separately comparing a gradient value between every two adjacent pixel points in the to-be-detected region of the binary image in the arbitrary direction with a preset initial gradient threshold corresponding to the arbitrary direction, and acquiring an initial borderline in the arbitrary direction according to the comparison result; and determining the borderlines of the target image respectively according to the number of initial borderlines acquired in each direction.

A seventh feature, combinable with any of the previous or following features, determining the borderlines of the target image respectively according to the number of initial borderlines acquired in each direction comprises: executing the following operations for a detection result in an arbitrary direction: separately performing straight line detection on each initial borderline in the arbitrary direction according to position information of each initial borderline in the arbitrary direction when the number of initial borderlines acquired in the arbitrary direction is at least two, and acquiring borderlines in the arbitrary direction from the at least two initial borderlines in the arbitrary direction; or successively decreasing the preset initial gradient threshold corresponding to the arbitrary direction according to a preset first gradient difference when the number of initial borderlines acquired in the arbitrary direction is less than two, and detecting the to-be-detected region of the binary image in the arbitrary direction by using the decreased initial gradient threshold until the number of initial borderlines acquired in the arbitrary direction is at least two.

An eighth feature, combinable with any of the previous or following features, mapping the borderlines in the low-pixel image into the original image to acquire the target image in the original image comprises: acquiring an intersection point of every two adjacent borderlines in the low-pixel image; separately mapping the acquired intersection points into the original image according to the preset compression ratio, to generate corresponding mapping points in the original image; and successively connecting the mapping points mapped into the original image, and determining a quadrangle generated after the connection as the target image in the original image.

A ninth feature, combinable with any of the previous or following features, further comprising, after acquiring the target image in the original image, correcting the target image by using a projective transformation algorithm.

In a second implementation, a non-transitory, computer-readable medium storing one or more instructions executable by a computer system to perform operations comprising: acquiring an original image, wherein the original image comprises a target image; performing image compression processing on the original image according to a preset compression ratio, and creating a low-pixel image based on the image compression processing; determining borderlines of the target image in the low-pixel image; and mapping the determined borderlines of the low-pixel image into the original image, and creating a target image from the original image.

The foregoing and other described implementations can each, optionally, include one or more of the following features:

A first feature, combinable with any of the following features, performing image compression processing on the original image comprises: determining a position of each pixel point after compression according to the preset compression ratio; performing image compression processing on the original image by using a fast bilinear interpolation algorithm, and acquiring a pixel value of each pixel point after compression; and generating the low-pixel image according to the pixel value and the position of each pixel point after compression.

A second feature, combinable with any of the previous or following features, performing image compression processing on the original image using the fast bilinear interpolation algorithm and acquiring a pixel value of each pixel point after compression comprises: determining, among all original pixel points in the original image, four original pixel points corresponding to each pixel point after compression according to the preset compression ratio; determining, among the four original pixel points corresponding to each pixel point after compression, two pairs of original pixel points in a first direction and two pairs of original pixel points in a second direction, wherein the first direction is a horizontal direction and the second direction is a vertical direction, or the first direction is a vertical direction and the second direction is a horizontal direction; acquiring first interpolations respectively corresponding to the two pairs of original pixel points of each pixel point after compression in the first direction, and taking the acquired two first interpolations as initial interpolations; or, acquiring second interpolations respectively corresponding to the two pairs of original pixel points of each pixel point after compression in the second direction, and taking the acquired two second interpolations as initial interpolations; and calculating an interpolation corresponding to each pixel point after compression according to the initial interpolations corresponding to each pixel point after compression, and determining the pixel value of each pixel point after compression according to the calculated interpolation corresponding to each pixel point after compression.

A third feature, combinable with any of the previous or following features, determining borderlines of the target image in the low-pixel image comprises: determining a to-be-detected region from the low-pixel image; and performing borderline detection processing on the to-be-detected region according to a gradient value between every two adjacent pixel points in the to-be-detected region to determine the borderlines of the target image.

A fourth feature, combinable with any of the previous or following features, determining the to-be-detected region from the low-pixel image comprises: binarizing the low-pixel image to convert the low-pixel image into a binary image, wherein the binary image comprises only two colors; performing edge detection processing on the binary image to acquire at least one edge line in the binary image; separately dilating each edge line; connecting each dilated edge line to acquire connected regions; screening the connected regions according to position information of each connected region respectively to acquire a specific region, wherein the specific region is a region comprising a specific graphic portion in the target image; and determining a region other than the specific region in the low-pixel image as the to-be-detected region.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: acquiring an original image, wherein the original image comprises a target image; performing image compression processing on the original image according to a preset compression ratio, and creating a low-pixel image based on the image compression processing; determining borderlines of the target image in the low-pixel image; and mapping the determined borderlines of the low-pixel image into the original image, and creating a target image from the original image.

The foregoing and other described implementations can each, optionally, include one or more of the following features:

A first feature, combinable with any of the following features, performing image compression processing on the original image comprises: determining a position of each pixel point after compression according to the preset compression ratio; performing image compression processing on the original image by using a fast bilinear interpolation algorithm, and acquiring a pixel value of each pixel point after compression; and generating the low-pixel image according to the pixel value and the position of each pixel point after compression.

A second feature, combinable with any of the previous or following features, performing image compression processing on the original image using the fast bilinear interpolation algorithm and acquiring a pixel value of each pixel point after compression comprises: determining, among all original pixel points in the original image, four original pixel points corresponding to each pixel point after compression according to the preset compression ratio; determining, among the four original pixel points corresponding to each pixel point after compression, two pairs of original pixel points in a first direction and two pairs of original pixel points in a second direction, wherein the first direction is a horizontal direction and the second direction is a vertical direction, or the first direction is a vertical direction and the second direction is a horizontal direction; acquiring first interpolations respectively corresponding to the two pairs of original pixel points of each pixel point after compression in the first direction, and taking the acquired two first interpolations as initial interpolations; or, acquiring second interpolations respectively corresponding to the two pairs of original pixel points of each pixel point after compression in the second direction, and taking the acquired two second interpolations as initial interpolations; and calculating an interpolation corresponding to each pixel point after compression according to the initial interpolations corresponding to each pixel point after compression, and determining the pixel value of each pixel point after compression according to the calculated interpolation corresponding to each pixel point after compression.

A third feature, combinable with any of the previous or following features, determining borderlines of the target image in the low-pixel image comprises: determining a to-be-detected region from the low-pixel image; and performing borderline detection processing on the to-be-detected region according to a gradient value between every two adjacent pixel points in the to-be-detected region to determine the borderlines of the target image.

A fourth feature, combinable with any of the previous or following features, determining the to-be-detected region from the low-pixel image comprises: binarizing the low-pixel image to convert the low-pixel image into a binary image, wherein the binary image comprises only two colors; performing edge detection processing on the binary image to acquire at least one edge line in the binary image; separately dilating each edge line; connecting each dilated edge line to acquire connected regions; screening the connected regions according to position information of each connected region respectively to acquire a specific region, wherein the specific region is a region comprising a specific graphic portion in the target image; and determining a region other than the specific region in the low-pixel image as the to-be-detected region.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or an equivalent term as understood by one of ordinary skill in the art) refer to data processing hardware and encompass all kinds of apparatus, devices, and machines for processing data, including by way of example, a programmable processor, a computer, or multiple processors or computers. The computer can also be, or further include special purpose logic circuitry, for example, a central processing unit (CPU), an FPGA (field programmable gate array), or an ASIC (application-specific integrated circuit). In some implementations, the computer or computer-implemented system or special purpose logic circuitry (or a combination of the computer or computer-implemented system and special purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system of some type, for example LINUX, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what can be claimed, but rather as descriptions of features that can be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method comprising:
acquiring an original image, wherein the original image comprises a target image;
performing image compression processing on the original image according to a preset compression ratio, and creating a low-pixel image based on the image compression processing;
determining borderlines of the target image in the low-pixel image; and
mapping the determined borderlines of the low-pixel image into the original image, and creating a target image from the original image,
wherein performing image compression processing on the original image comprises:
determining a position of each pixel point after compression according to the preset compression ratio;
determining, among all original pixel points in the original image, four original pixel points corresponding to each pixel point after compression according to the preset compression ratio;
determining, among the four original pixel points corresponding to each pixel point after compression, two pairs of original pixel points in a first direction and two pairs of original pixel points in a second direction, wherein the first direction is a horizontal direction and the second direction is a vertical direction, or the first direction is a vertical direction and the second direction is a horizontal direction;
acquiring first interpolations respectively corresponding to the two pairs of original pixel points of each pixel point after compression in the first direction, and taking the acquired two first interpolations as initial interpolations; or, acquiring second interpolations respectively corresponding to the two pairs of original pixel points of each pixel point after compression in the second direction, and taking the acquired two second interpolations as initial interpolations; and
calculating an interpolation corresponding to each pixel point after compression according to the initial interpolations corresponding to each pixel point after compression, and determining a pixel value of each pixel point after compression according to the calculated interpolation corresponding to each pixel point after compression; and
generating the low-pixel image according to the pixel value and the position of each pixel point after compression.

2. The computer-implemented method of claim 1, wherein determining borderlines of the target image in the low-pixel image comprises:
determining a to-be-detected region from the low-pixel image; and
performing borderline detection processing on the to-be-detected region according to a gradient value between every two adjacent pixel points in the to-be-detected region to determine the borderlines of the target image.

3. The computer-implemented method of claim 2, wherein determining the to-be-detected region from the low-pixel image comprises:
binarizing the low-pixel image to convert the low-pixel image into a binary image, wherein the binary image comprises only two colors;
performing edge detection processing on the binary image to acquire at least one edge line in the binary image;
separately dilating each edge line;
connecting each dilated edge line to acquire connected regions;
screening the connected regions according to position information of each connected region respectively to acquire a specific region, wherein the specific region is a region comprising a specific graphic portion in the target image; and determining a region other than the specific region in the low-pixel image as the to-be-detected region.

4. The computer-implemented method of claim 3, before the performing edge detection processing on the binary image, further comprising performing Gauss smoothing on the binary image by using a preset Gauss smoothing parameter.

5. The computer-implemented method of claim 2, wherein performing borderline detection processing on the to-be-detected region according to a gradient value between every two adjacent pixel points in the to-be-detected region, to determine the borderlines of the target image comprises:

binarizing the low-pixel image to convert the low-pixel image into a binary image, wherein the binary image comprises only two colors;

executing the following operations in an arbitrary direction: separately comparing a gradient value between every two adjacent pixel points in the to-be-detected region of the binary image in the arbitrary direction with a preset initial gradient threshold corresponding to the arbitrary direction, and acquiring an initial borderline in the arbitrary direction according to a comparison result; and determining the borderlines of the target image respectively according to a number of initial borderlines acquired in each direction.

6. The computer-implemented method of claim 5, wherein determining the borderlines of the target image respectively according to the number of initial borderlines acquired in each direction comprises:

executing the following operations for a detection result in an arbitrary direction:

separately performing straight line detection on each initial borderline in the arbitrary direction according to position information of each initial borderline in the arbitrary direction when the number of initial borderlines acquired in the arbitrary direction is at least two, and acquiring borderlines in the arbitrary direction from at least two of the initial borderlines in the arbitrary direction; or successively decreasing the preset initial gradient threshold corresponding to the arbitrary direction according to a preset first gradient difference when the number of initial borderlines acquired in the arbitrary direction is less than two, and detecting the to-be-detected region of the binary image in the arbitrary direction by using the decreased initial gradient threshold until the number of initial borderlines acquired in the arbitrary direction is at least two.

7. The computer-implemented method of claim 2, wherein mapping the borderlines in the low-pixel image into the original image, to acquire the target image in the original image comprises:

acquiring an intersection point of every two adjacent borderlines in the low-pixel image;

separately mapping the acquired intersection points into the original image according to the preset compression ratio, to generate corresponding mapping points in the original image; and successively connecting the mapping points mapped into the original image, and determining a quadrangle generated after the connection as the target image in the original image.

8. The computer-implemented method of claim 2, further comprising, after acquiring the target image in the original image, correcting the target image by using a projective transformation algorithm.

9. A non-transitory, computer-readable medium storing one or more instructions executable by a computer system to perform operations comprising:

acquiring an original image, wherein the original image comprises a target image;

performing image compression processing on the original image according to a preset compression ratio, and creating a low-pixel image based on the image compression processing;

determining borderlines of the target image in the low-pixel image; and mapping the determined borderlines of the low-pixel image into the original image, and creating a target image from the original image, wherein performing image compression processing on the original image comprises:

determining a position of each pixel point after compression according to the preset compression ratio;

determining, among all original pixel points in the original image, four original pixel points corresponding to each pixel point after compression according to the preset compression ratio;

determining, among the four original pixel points corresponding to each pixel point after compression, two pairs of original pixel points in a first direction and two pairs of original pixel points in a second direction, wherein the first direction is a horizontal direction and the second direction is a vertical direction, or the first direction is a vertical direction and the second direction is a horizontal direction;

acquiring first interpolations respectively corresponding to the two pairs of original pixel points of each pixel point after compression in the first direction, and taking the acquired two first interpolations as initial interpolations; or, acquiring second interpolations respectively corresponding to the two pairs of original pixel points of each pixel point after compression in the second direction, and taking the acquired two second interpolations as initial interpolations; and calculating an interpolation corresponding to each pixel point after compression according to the initial interpolations corresponding to each pixel point after compression, and determining a pixel value of each pixel point after compression according to the calculated interpolation corresponding to each pixel point after compression; and generating the low-pixel image according to the pixel value and the position of each pixel point after compression.

10. The non-transitory, computer-readable medium of claim 9, wherein determining borderlines of the target image in the low-pixel image comprises:

determining a to-be-detected region from the low-pixel image; and performing borderline detection processing on the to-be-detected region according to a gradient value between every two adjacent pixel points in the to-be-detected region to determine the borderlines of the target image.

11. The non-transitory, computer-readable medium of claim 10, wherein determining the to-be-detected region from the low-pixel image comprises:

binarizing the low-pixel image to convert the low-pixel image into a binary image, wherein the binary image comprises only two colors;

performing edge detection processing on the binary image to acquire at least one edge line in the binary image;

separately dilating each edge line;

connecting each dilated edge line to acquire connected regions;

screening the connected regions according to position information of each connected region respectively to acquire a specific region, wherein the specific region is a region comprising a specific graphic portion in the target image; and determining a region other than the specific region in the low-pixel image as the to-be-detected region.

12. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

acquiring an original image, wherein the original image comprises a target image;

performing image compression processing on the original image according to a preset compression ratio, and creating a low-pixel image based on the image compression processing;

determining borderlines of the target image in the low-pixel image; and mapping the determined borderlines of the low-pixel image into the original image, and creating a target image from the original image, wherein performing image compression processing on the original image comprises:

determining a position of each pixel point after compression according to the preset compression ratio;

determining, among all original pixel points in the original image, four original pixel points corresponding to each pixel point after compression according to the preset compression ratio;

determining, among the four original pixel points corresponding to each pixel point after compression, two pairs of original pixel points in a first direction and two pairs of original pixel points in a second direction, wherein the first direction is a horizontal direction and the second direction is a vertical direction, or the first direction is a vertical direction and the second direction is a horizontal direction;

acquiring first interpolations respectively corresponding to the two pairs of original pixel points of each pixel point after compression in the first direction, and taking the acquired two first interpolations as initial interpolations; or, acquiring second interpolations respectively corresponding to the two pairs of original pixel points of each pixel point after compression in the second direction, and taking the acquired two second interpolations as initial interpolations; and calculating an interpolation corresponding to each pixel point after compression according to the initial interpolations corresponding to each pixel point after compression, and determining a pixel value of each pixel point after compression according to the calculated interpolation corresponding to each pixel point after compression; and generating the low-pixel image according to the pixel value and the position of each pixel point after compression.

13. The computer-implemented system of claim 12, wherein determining borderlines of the target image in the low-pixel image comprises:

determining a to-be-detected region from the low-pixel image; and performing borderline detection processing on the to-be-detected region according to a gradient value between every two adjacent pixel points in the to-be-detected region to determine the borderlines of the target image.

14. The computer-implemented system of claim 13, wherein determining the to-be-detected region from the low-pixel image comprises:

binarizing the low-pixel image to convert the low-pixel image into a binary image, wherein the binary image comprises only two colors;

performing edge detection processing on the binary image to acquire at least one edge line in the binary image;

separately dilating each edge line;

connecting each dilated edge line to acquire connected regions;

screening the connected regions according to position information of each connected region respectively to acquire a specific region, wherein the specific region is a region comprising a specific graphic portion in the target image; and determining a region other than the specific region in the low-pixel image as the to-be-detected region.

* * * * *